＊US005993881A＊

United States Patent [19]
Gray et al.

[11] Patent Number: 5,993,881
[45] Date of Patent: Nov. 30, 1999

[54] COMPOSITIONS FOR INHIBITING OXIDATION

[75] Inventors: James Ian Gray, Haslett; Alden M. Booren, Lansing; Muraleedharan G. Nair, Okemos; Yu-Chen Chang, Lansing; Gale M. Strasburg, East Lansing; Haibo Wang, East Lansing; Enayat A. Gomaa, East Lansing, all of Mich.

[73] Assignee: Board of Trustees operating Michigan State University, East Lansing, Mich.

[21] Appl. No.: 09/061,782

[22] Filed: Apr. 16, 1998

Related U.S. Application Data

[62] Division of application No. 08/799,788, Feb. 12, 1997.
[51] Int. Cl.[6] ........................................... A23B 4/00
[52] U.S. Cl. ........................... 426/541; 426/544; 426/545
[58] Field of Search ................................... 426/541, 544, 426/545, 546, 654

[56] References Cited

U.S. PATENT DOCUMENTS 5,503,867  4/1996  Pleva .......................................... 426/646

OTHER PUBLICATIONS

Anon., AN 433225 Frosti, abstracting Food Formulating, 1996, (Jul.–Aug.), 19.
Anon., AN 414830 Frosti, abstracting Kennedy's Confection, 1996, 3(6), 29.
Anon., AN 410760 Frosti, abstracting Dairy Industries International, 1996, 61(3), 23–24.
Herrmann, K., An 380069 Frosti, abstractig Gordian, 1995, 95(5), 84–86.
Tsuda et al., AN 360879 Frosti, abstracting Journal of Agricultural and Food Chemistry, 1994, 42(11), 2407–2410.
Harborne, J.B., et al., Phytochemistry 3:453–463 (1964).
Dekazos, E.D., J. Food Sci. 35:237–241 (1970).
Chandra, A., et al., J. Agric. Food Chem. 40:967–969 (1992).
Shrikhande, A.J. and F.J. Francis, J. Food Sci. 38:649–651 (1973).
Chandra. A. et al., J. Agric Food Chem. 41:1062–1065 (1993).
Glabgen, W.E., et al, Phytochemistry 31:1593–1601 (1992).
Agrawal, P.K., et al., Flavonoid Glycoside in Carbon–13 NMR of Flavonoids (Ed. Agrawal, P.K.) Elsevier, Amsterdam 283–364 (1989).
Agrawal, P.K., Phytochemistry 31:3307–3330 (1992).
Hong, V., et al., J. Agric. food Chem. 38:698–708 (1990).
Hong, V., et al., J. Agric. Food Chem. 38:708–715 (1990).
Arora, A., and G. M. Strasburg, J. Am. Chem. Soc. 1996.
MacDonald, R.C., et al., Biochim. Biophys. Acta 1061:297–303 (1991).

*Primary Examiner*—Leslie Wong
*Attorney, Agent, or Firm*—Ian C. McLeod

[57] ABSTRACT

Anthocyanin containing fractions isolated from tart cherries and exhibiting inhibition of oxidation when introduced into various materials is described. The fractions are particularly useful in high and low moisture foods.

4 Claims, 21 Drawing Sheets

| | R₁ | R₂ |
|---|---|---|
| Anthocyanin 1 (cyanidin-3-glucosylrutinoside) | glucose | rhamnose |
| Anthocyanin 2 (cyanidin-3-rutinoside) | H | rhamnose |
| Anthocyanin 3 (cyanidin-3-glucoside) | H | H |

COMPOSITIONS FOR INHIBITING OXIDATION

This application is a divisional of application Ser. No. 08/799,788 filed on Feb. 12, 1997.

BACKGROUND OF THE INVENTION

(1) Summary of the Invention

The present invention relates to a method and compositions for inhibiting oxidation in various materials, particularly lipids and most particularly in foods. In particular, the present invention uses a tart cherry natural extract containing a mixture of anthocyanins to accomplish the inhibition.

(2) Description of Related Art

Prunus Cerasus L. (Rosacease), cv. MONTMORENCY is the major tart cherry commercially grown in the United States. An artificial red dye is frequently added to MONTMORENCY cherry food products to enhance its low natural red color. In order to challenge the MONTMORENCY monoculture, a new cultivar, BALATON tart cherry (Ujferbertoi furtos), was introduced into the United States in 1984, and has been tested in Michigan, Utah, and Wisconsin. BALATON produces fruits darker than MONTMORENCY.

Colorants like anthocyanins were regarded as the index of quality in tart cherries. Most importantly, recent results showed that anthocyanins such as cyanidin-3-glucoside have strong antioxidant activities (Tsuda, T., et al, J. Agric. Food Chem. 42:2407–2410 (1994)). The addition of antioxidants is one of the popular methods to increase the shelf life of food products which is thought to be associated with lipid peroxidation. Natural antioxidants may play an important role in the prevention of carcinogenesis. Dietary antioxidants may be effective against the preoxidative damage in living systems (Halliwell, B. and J. M. C. Gutteridge, Free radicals in biology and medicine. Oxford University Press, New York 416–494 (1989); Osawa, T., et al, Role of dietary antioxidants in protection against oxidative damage. In antimutagenesis and anticarcinogenesis Mechanisms; Kuroda, Y.; Shankel, D. M., Waters, M. D., Eds.; Plenum Publishing. New York 139–153 (1990)).

Early studies have showed that MONTMORENCY cherry contains cyanidin-3-gentiobioside and cyanidin-3-rutinoside (Li, K. C., et al., J. Am. Chem. Soc. 78:979–980 (1956)). Cyanidin-3-glucosylrutinoside was also found in six out of the seven sour cherry varieties (Harborne, J. B., et al., Phytochemistry 3:453–463 (1964)). Dekazos (Dekazos, E.D., J. Food Sci. 35:237–241 (1970)) reported anthocyanin pigments in MONTMORENCY cherry as peonidin-3-rutinoside, peonidin and cyanidin along withcyanidin-3-sophoroside, cyanidin-3-rutinoside and cyanidin-3-glucoside. However, cyanidin-3-glucosylrutinoside as well as cyanidin-3-glucoside, cyanidin-3-sophoroside and cyanidin-3-rutinoside were identified as main pigments in sour cherries. Using HPLC retention values, Chandra et al (Chandra, A., et al., J. Agric. Food Chem. 40:967–969 (1992)) reported that cyanidin-3-sophoroside and cyanidin-3-glucoside were the major and minor anthocyanins, respectively, in Michigan grown MONTMORENCY cherry. Similarly, cyanidin-3-xylosylrutinoside was detected as a minor pigment in MONTMORENCY cherry (Shrikhande, A. J. and F. J. Francis, J. Food Sci. 38:649–651 (1973)).

U.S. Pat. No. 5,503,867 to Pleva describes the use of whole ground cherries and oat bran in ground meat. The amount of cherries used is 10 to 15% by weight and the oat bran is believed to be added to compensate for the juice in the cherries. In any event, the cherries definitely contribute a flavor to the meat.

There is a need for natural antioxidants for use, particularly in foods and other materials containing oxidizable compounds. Lipids in meats are particularly prone to oxidation and contribute to rancidity in cooked or uncooked foods and natural lipid products for a variety of uses.

OBJECTS

It is therefore an object of the present invention to provide an isolated and purified natural source composition which can be used in various materials prone to oxidation to prevent the oxidation. Further, it is an object of the present invention to provide a natural source composition which can be used in foods. Finally, it is an object of the present invention to provide a natural source composition which is economical to prepare and easy to use. These and other objects will become increasingly apparent by reference to the following description and the drawings.

DESCRIPTION OF PREFERRED EMBODIMENTS

Figure 1:
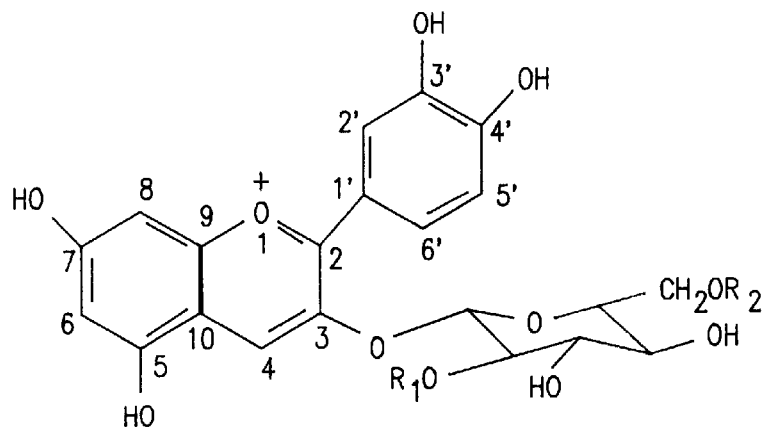
FIG. 1 shows the structure of the isolated anthocyanins from BALATON and MONTMORENCY cherries. The aglycone cyanidin has a hydroxyl group at position 3.
Figure 1:
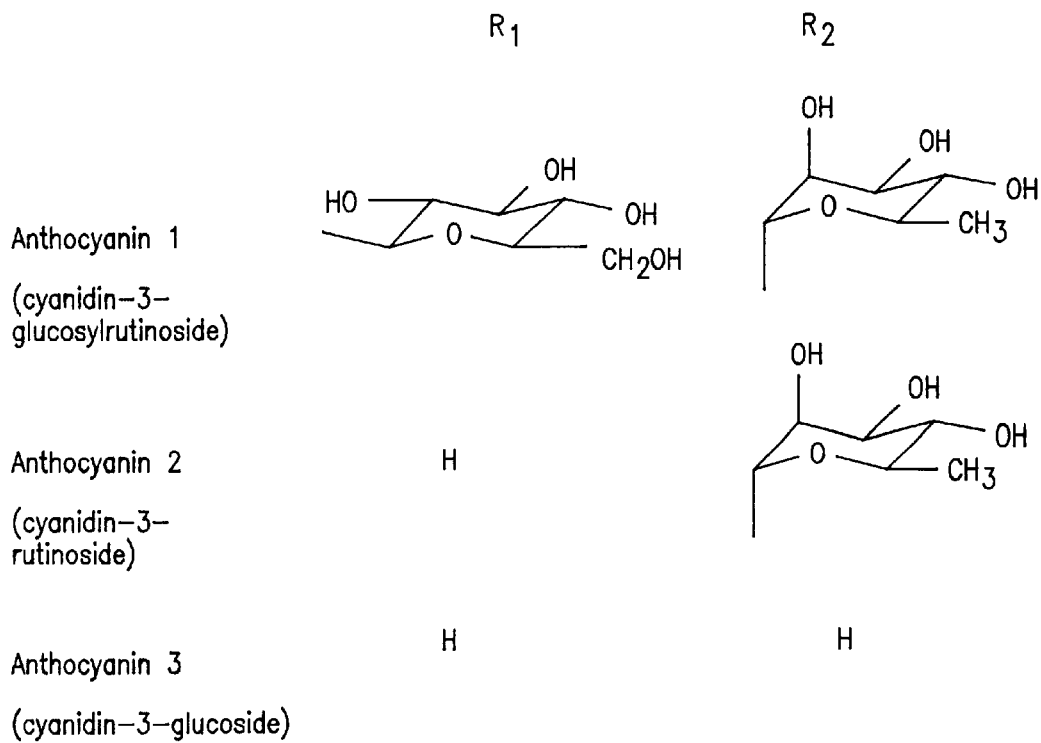
Figure 2:
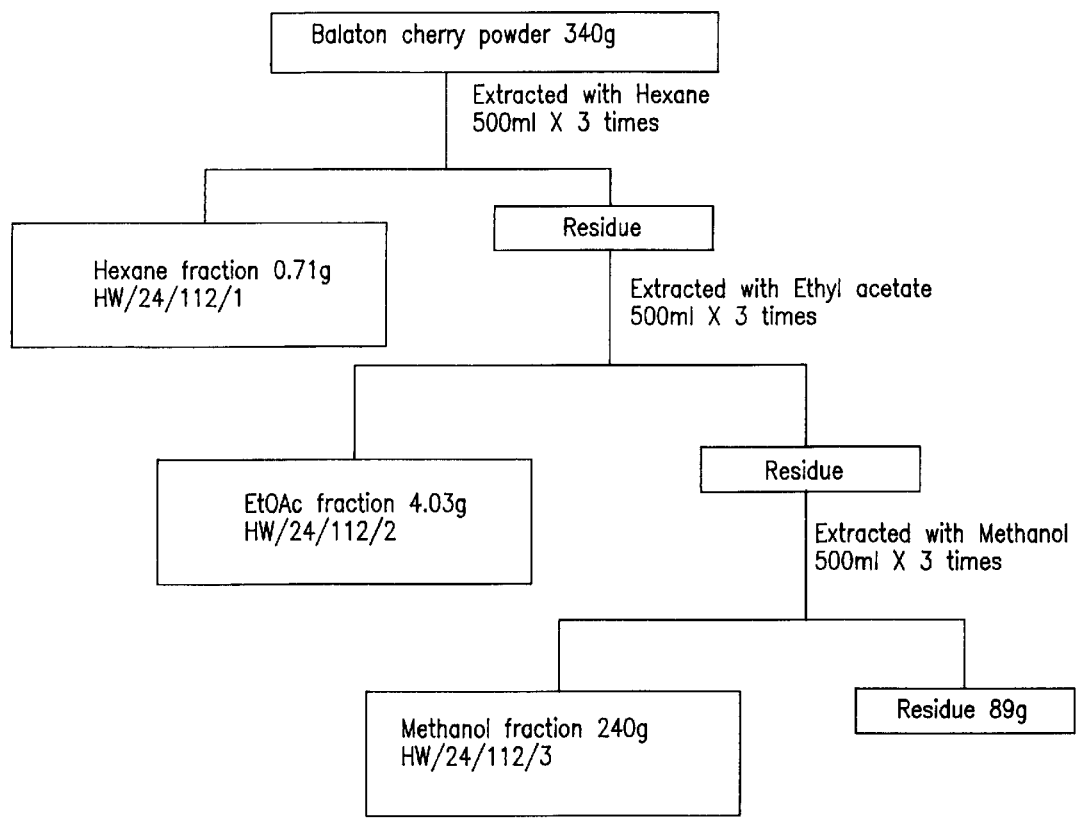
FIG. 2 is a schematic flow diagram showing a method of extraction of compounds from BALATON cherry.
Figure 3:
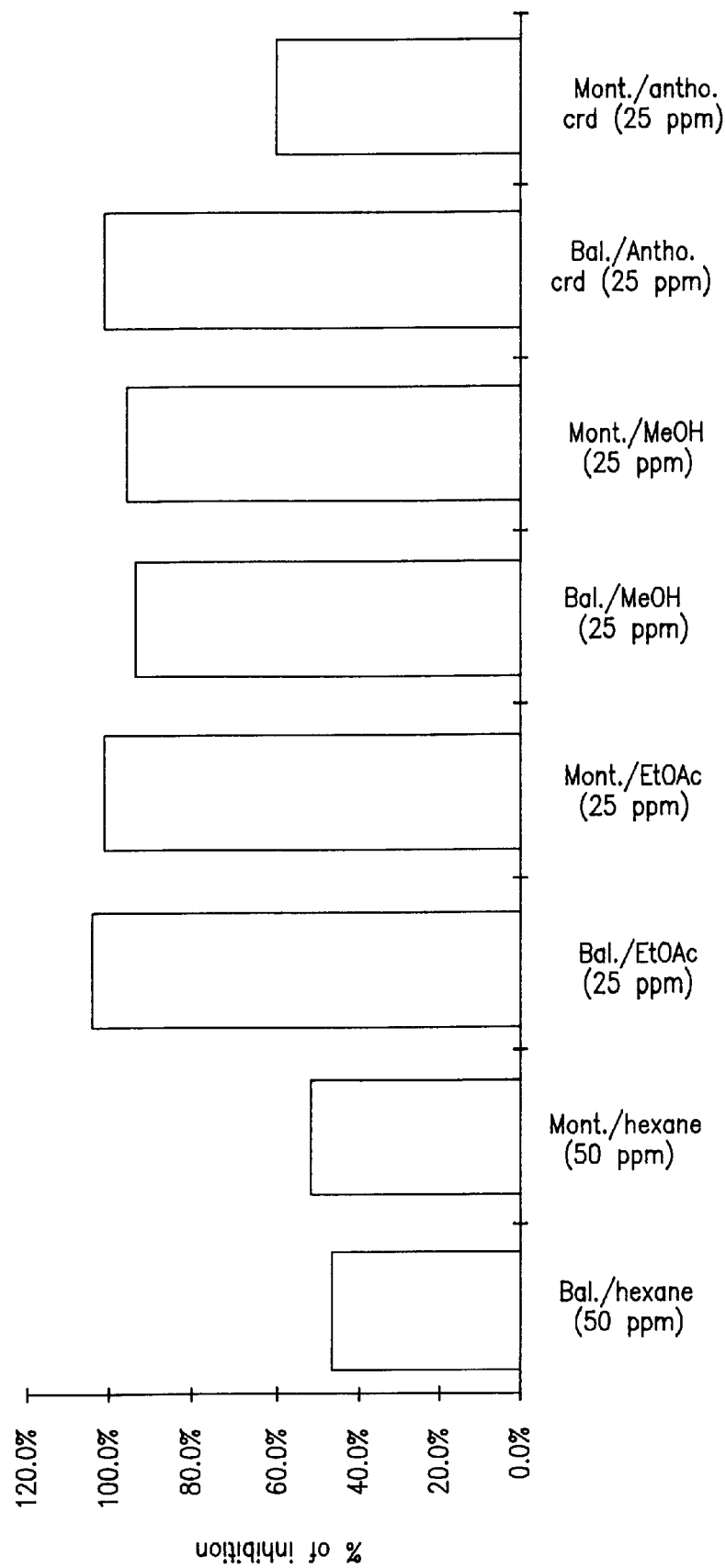
FIG. 3 is a graph showing the percent inhibition of oxidation by various crude cherry extracts produced by the method of FIG. 2. The assay is the fluorescent assay described in Example 2.
Figure 4:
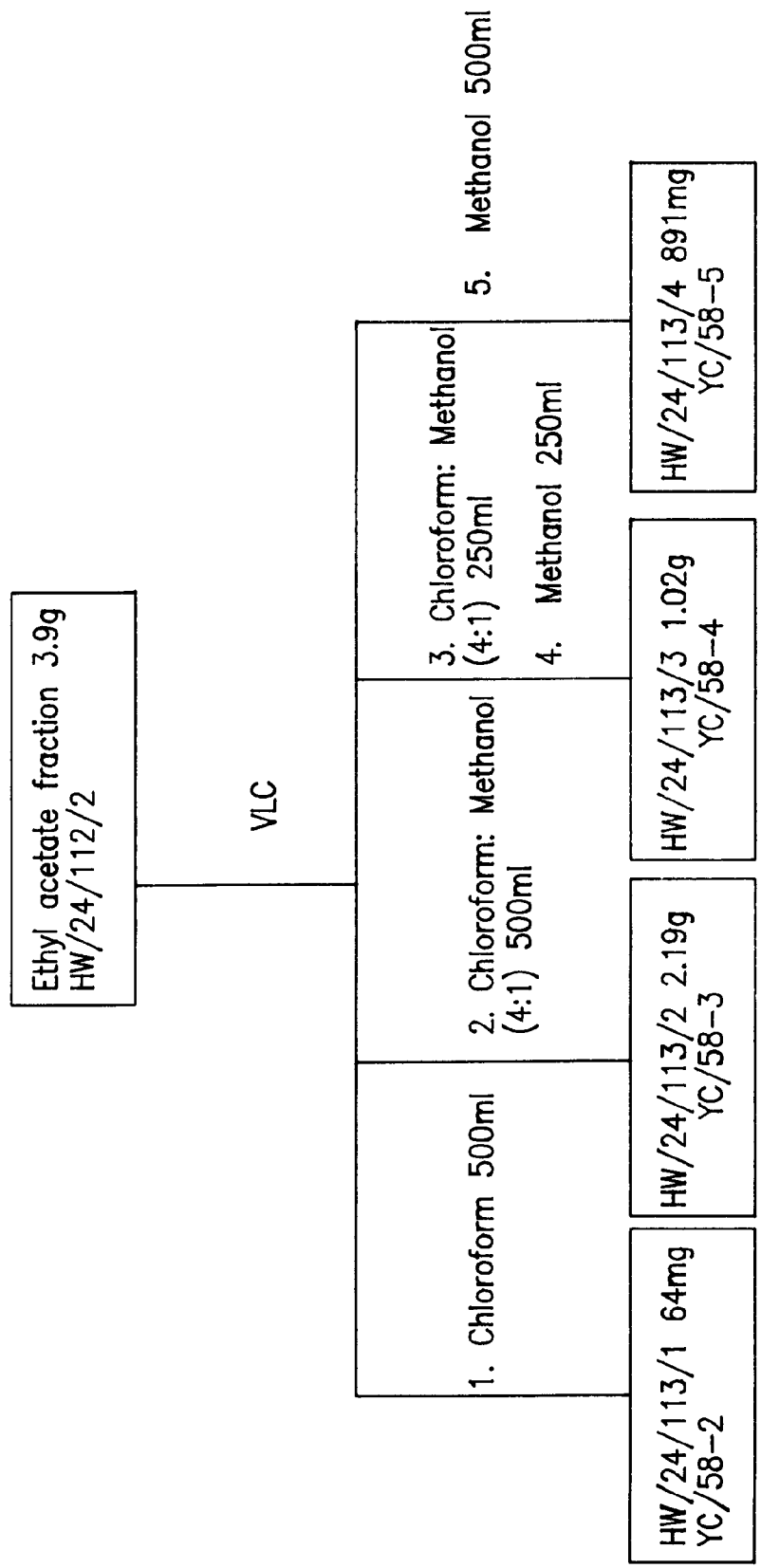
FIG. 4 is a schematic flow diagram showing the method of purification of the ethyl acetate extract of FIG. 2.
Figure 5:
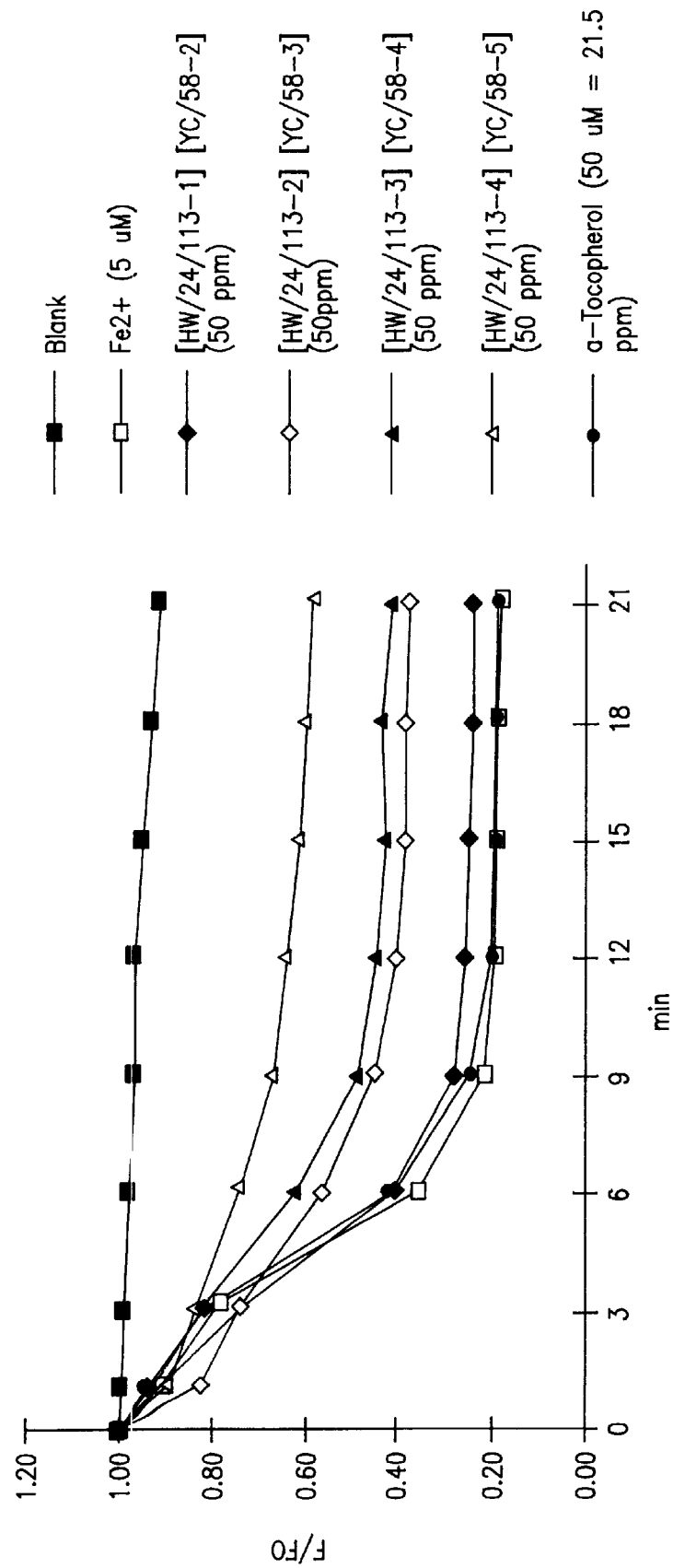
FIG. 5 is a graph showing the percent inhibition of oxidation by the purified extracts of FIG. 4 using the fluorescent assay.
Figure 6:
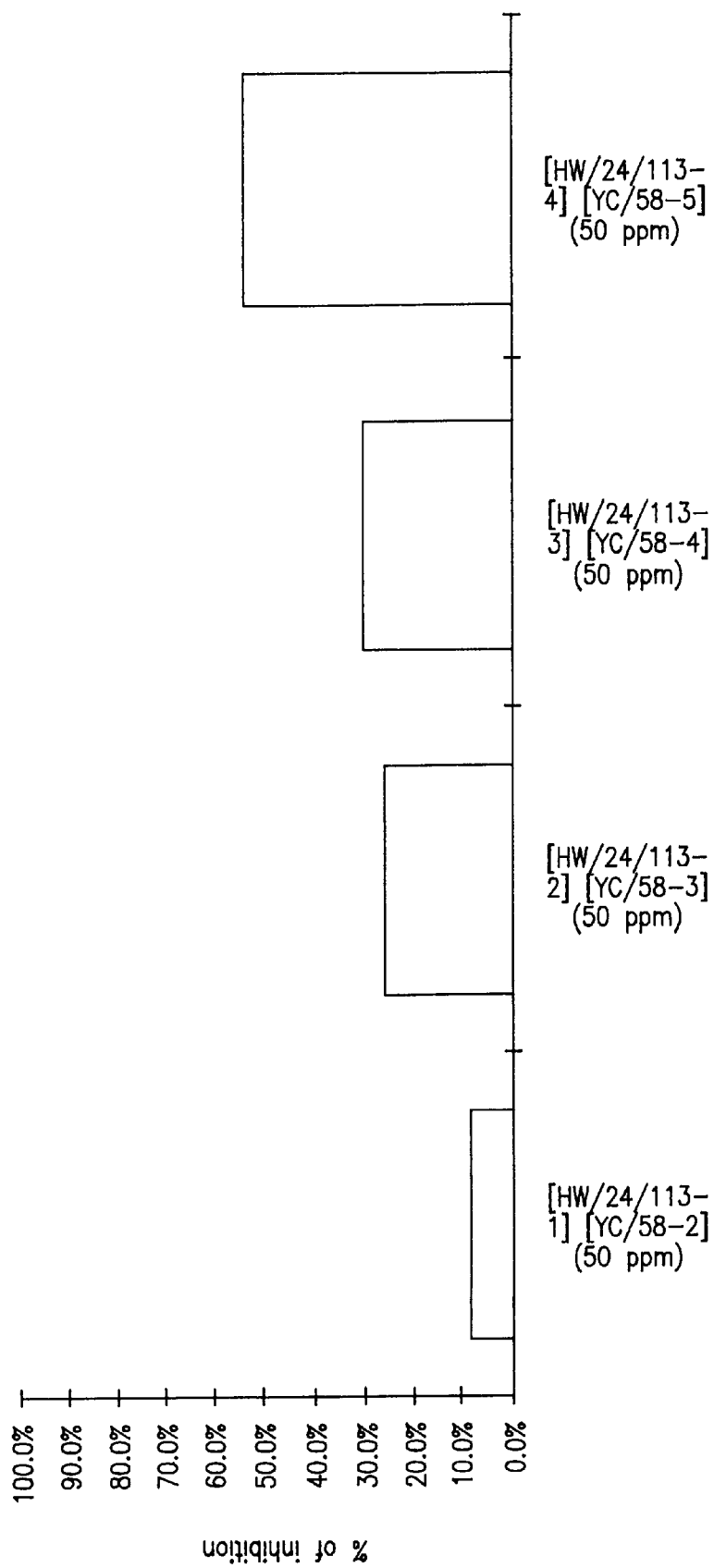
FIG. 6 is a graph showing the percent inhibition of FIG. 5 in bar graph form.
Figure 7:
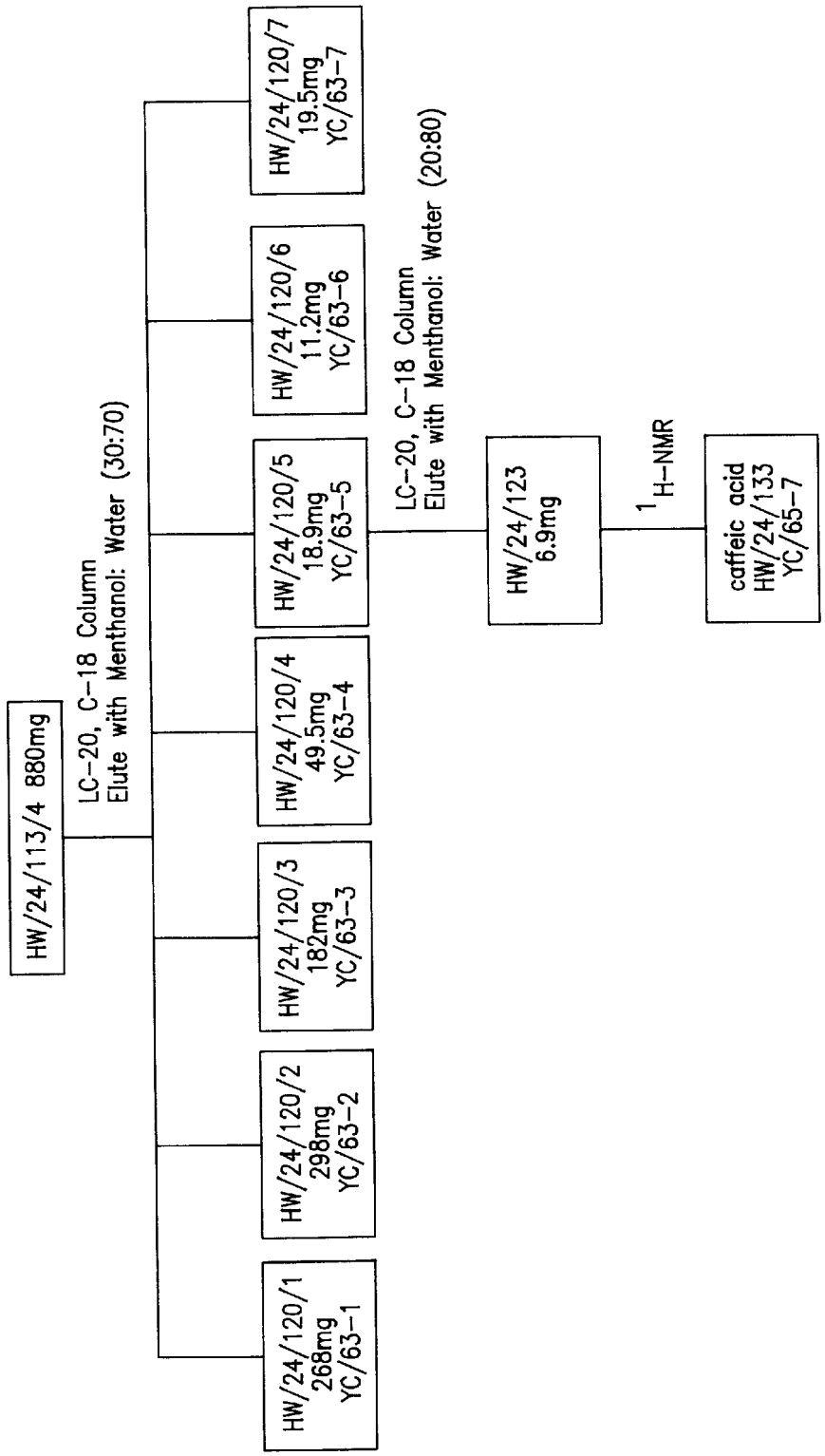
FIG. 7 is a schematic flow diagram showing the method of purification of the methanol fraction of FIG. 4.
Figure 8:
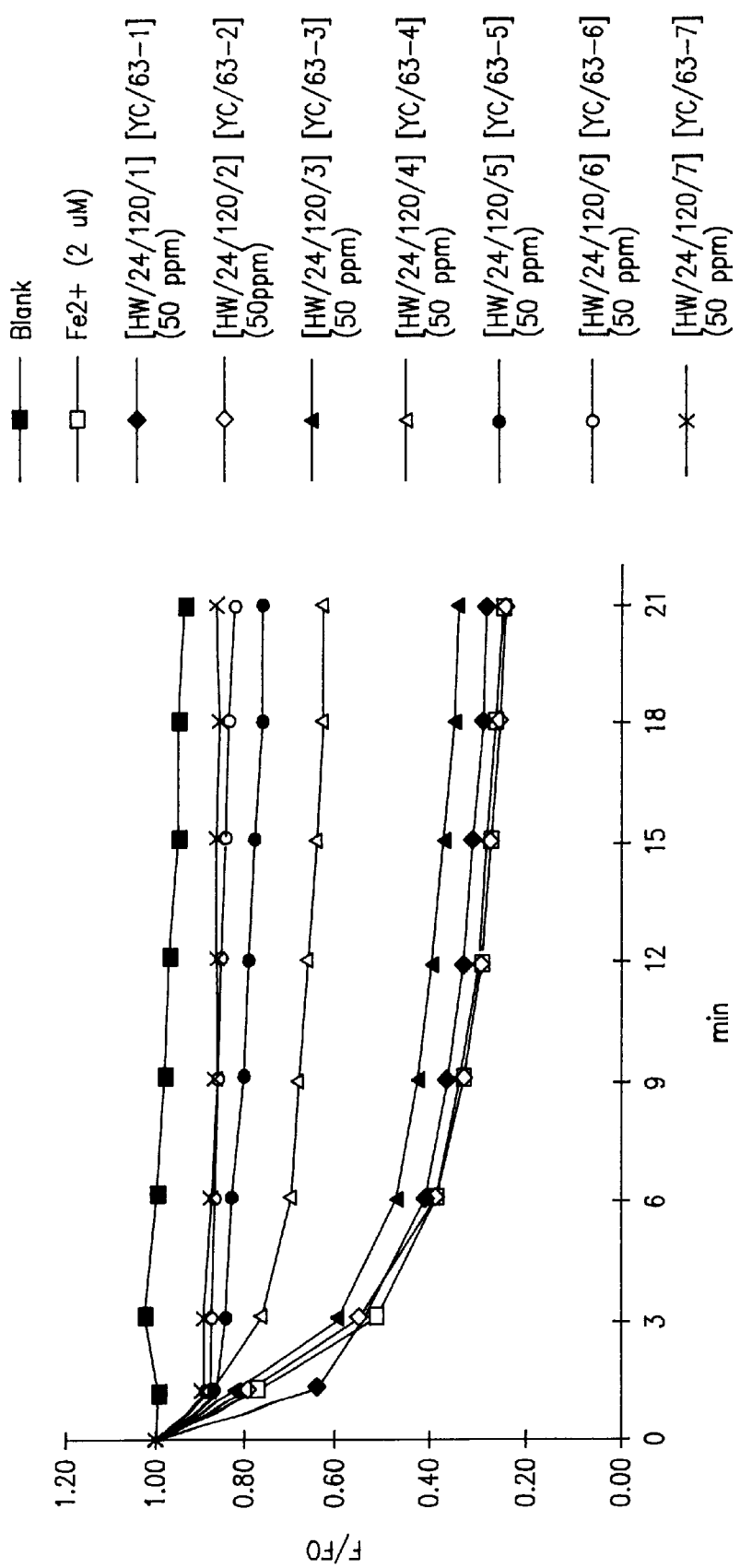
FIG. 8 is a graph showing the inhibition of oxidation by the various purified fractions produced by the method of FIG. 7.
Figure 9:
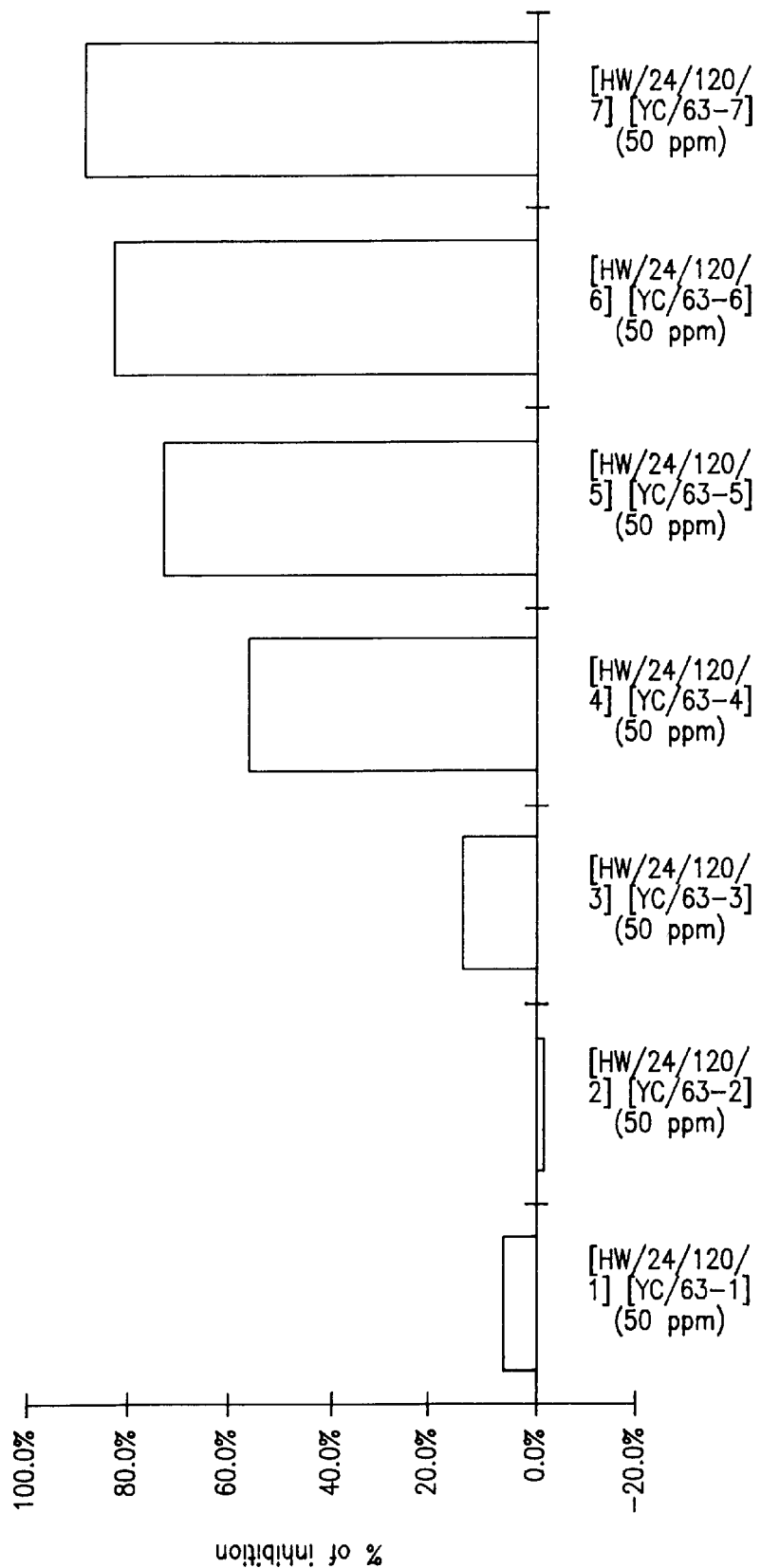
FIG. 9 is a bar graph showing the relative inhibition of oxidation by the various fractions of FIG. 7.
Figure 10:
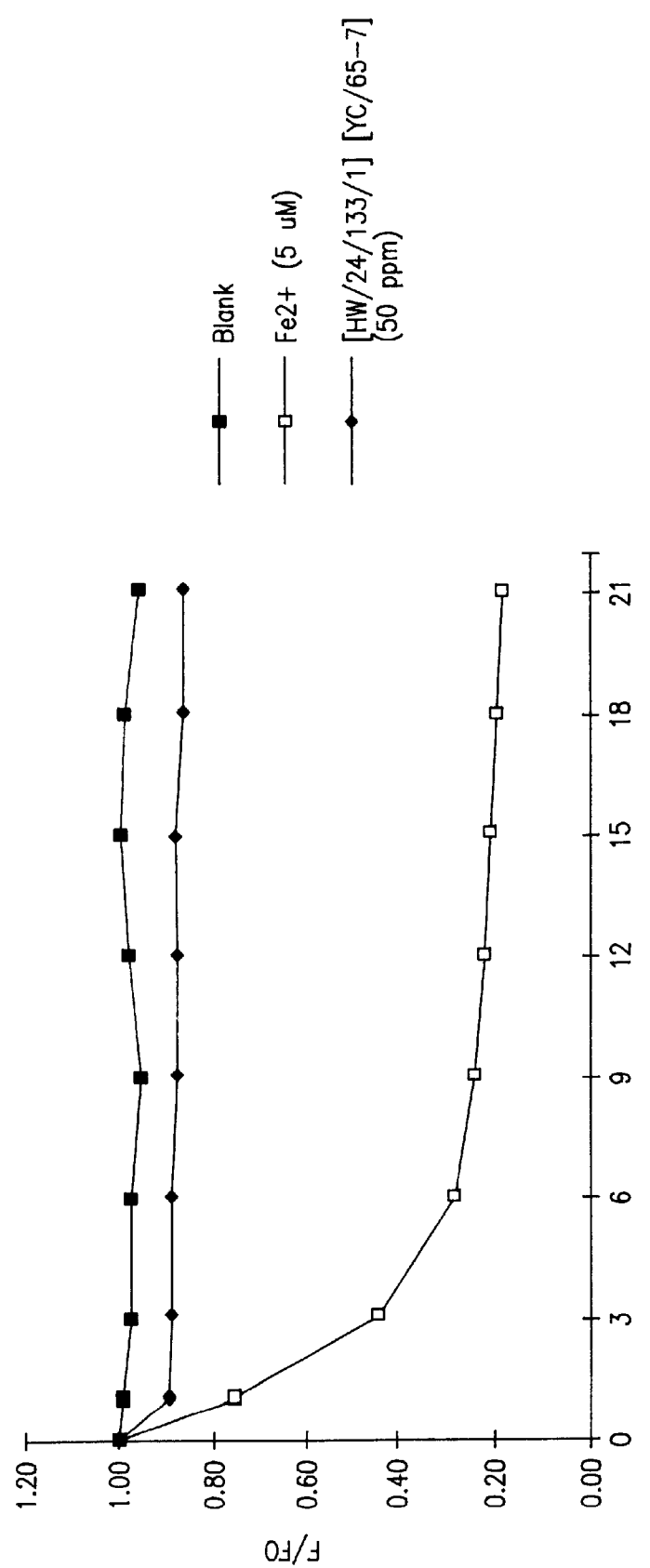
FIG. 10 is a graph showing the inhibition of oxidation by caffeic acid which is also extracted from the cherries as shown in FIG. 7.
Figure 11:
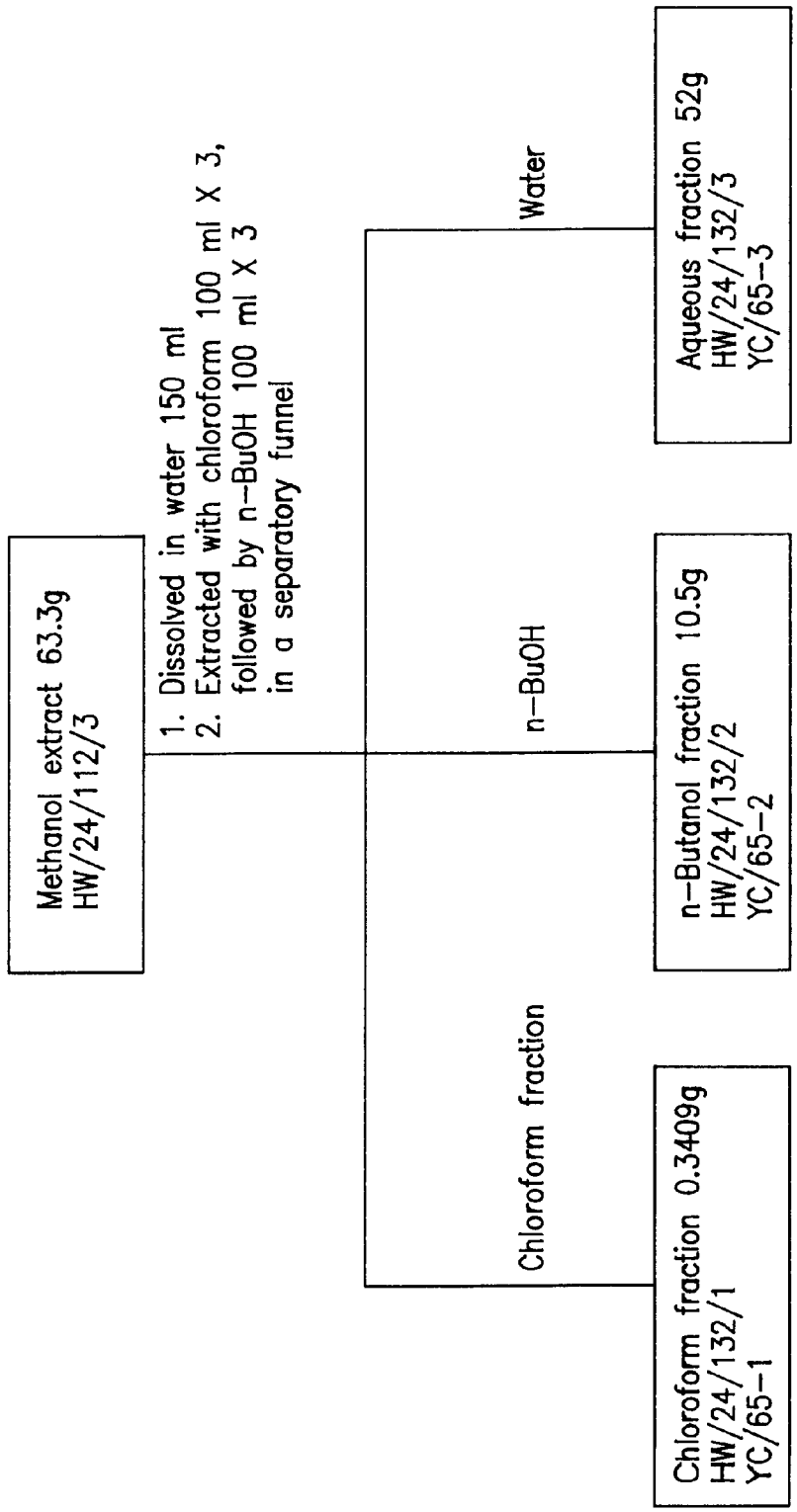
FIG. 11 is a schematic flow diagram of the method of purification of the methanol Fraction of FIG. 2.
Figure 12:
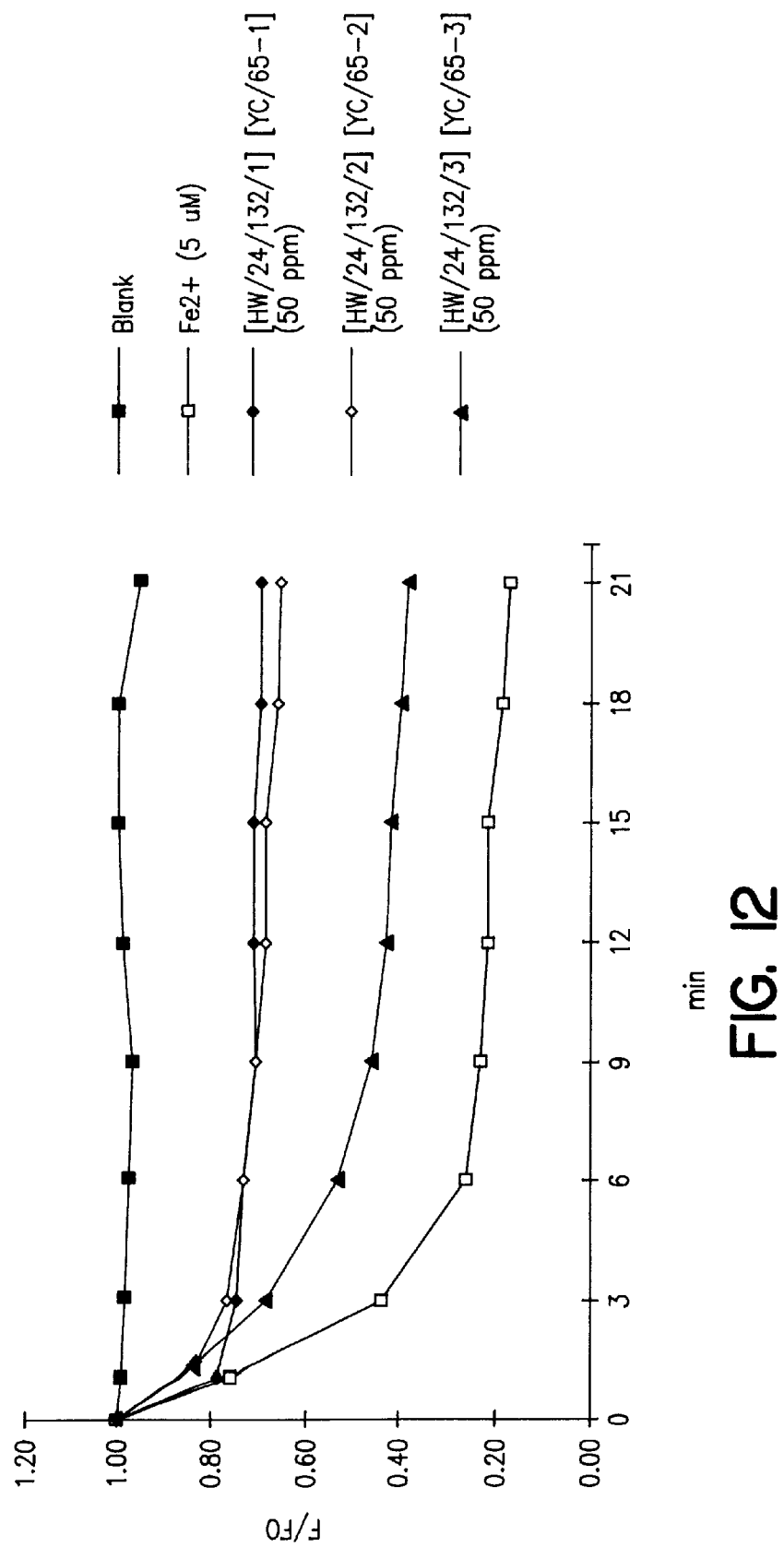
FIG. 12 is a graph showing the relative inhibition of oxidation of the various purified fractions.
Figure 13:
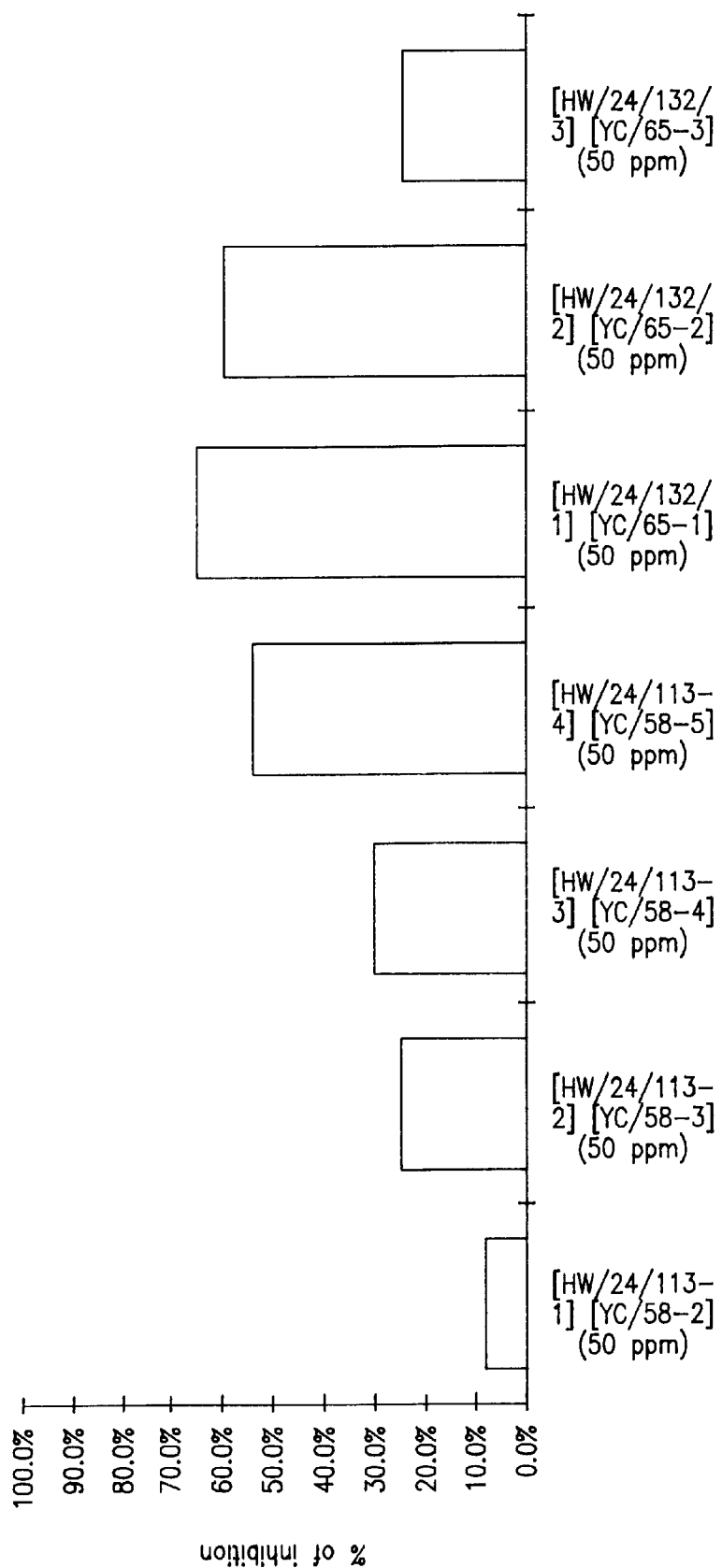
FIG. 13 is a bar graph showing the inhibition of oxidation by the various fractions of FIGS. 4 and 11.
Figure 14:
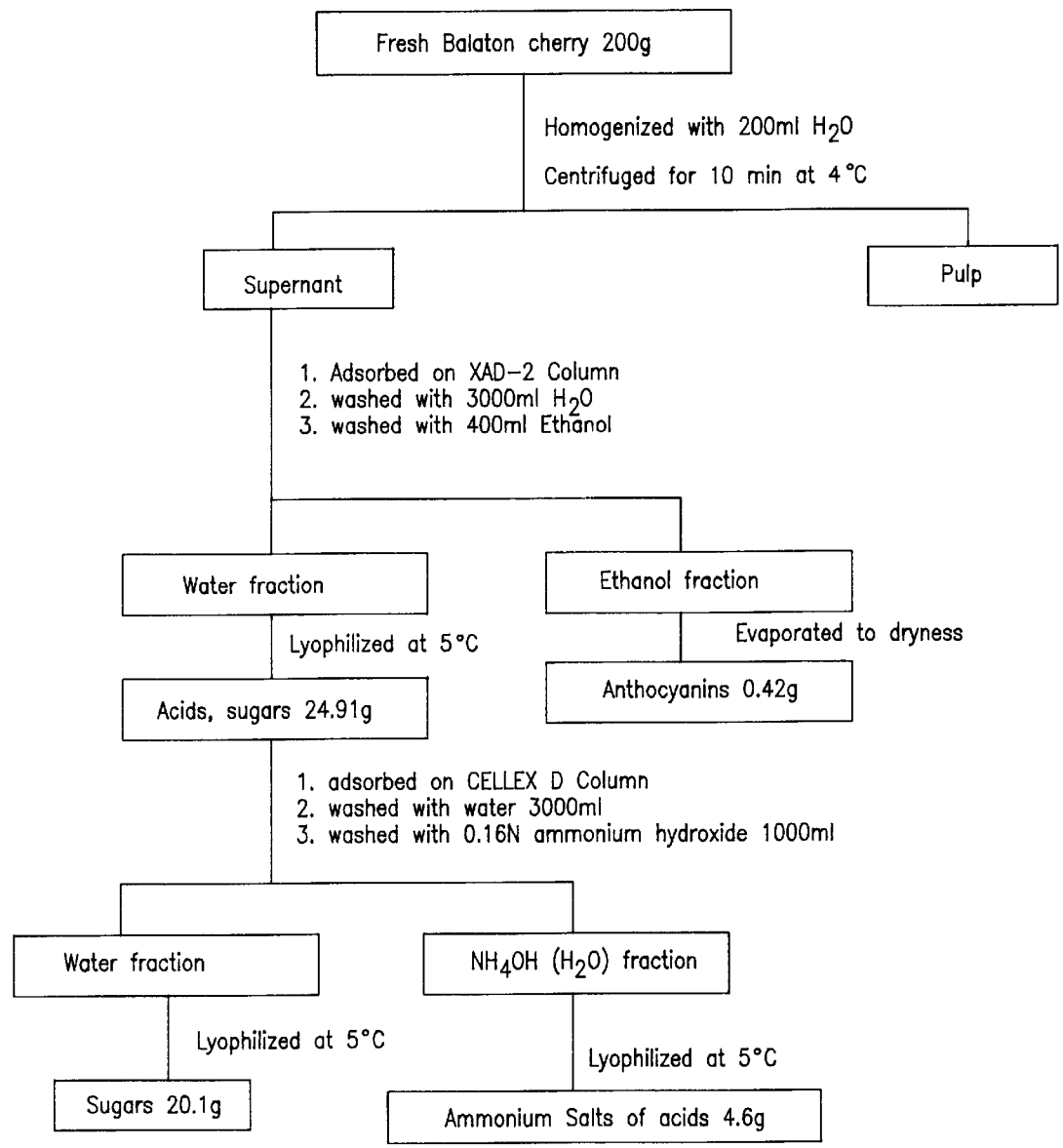
FIG. 14 is a schematic flow diagram of the method of extraction of various fractions from BALATON cherry.
Figure 15:
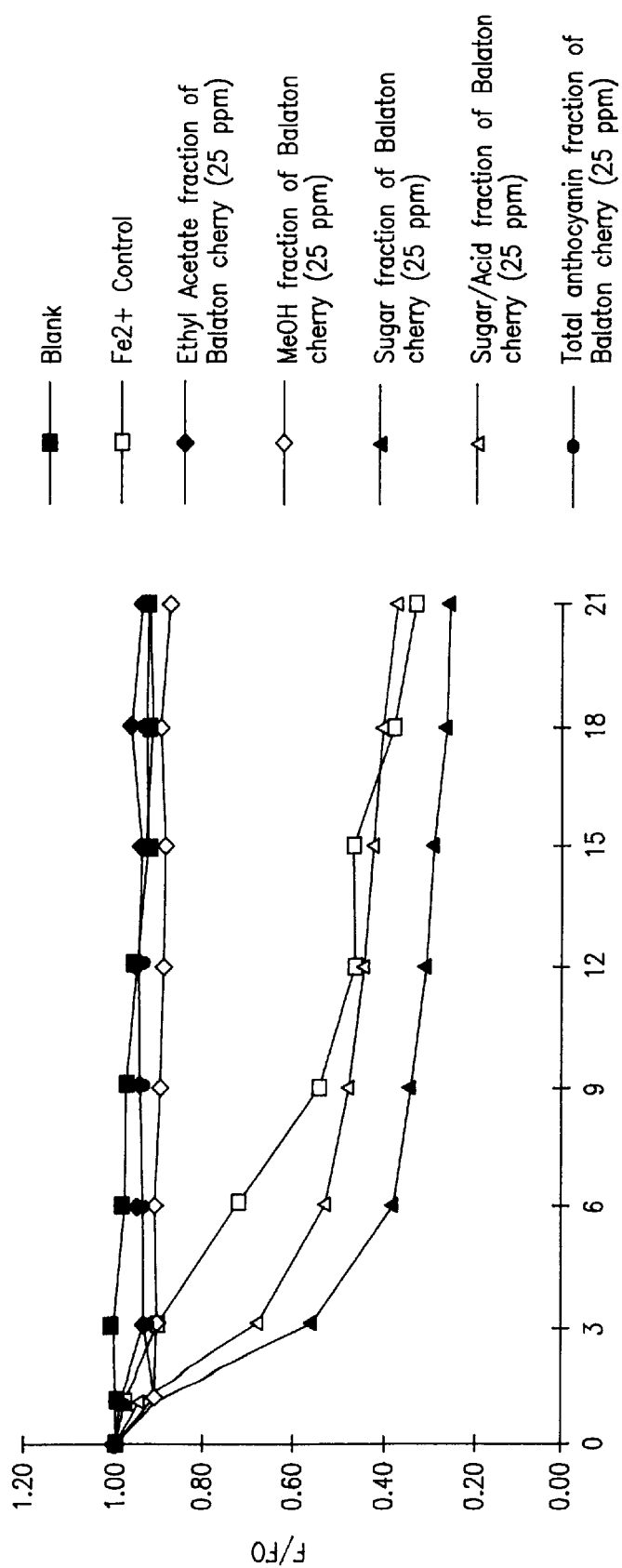
FIG. 15 is a graph showing the percentage inhibition of oxidation by various fractions of BALATON cherry.
Figure 16:
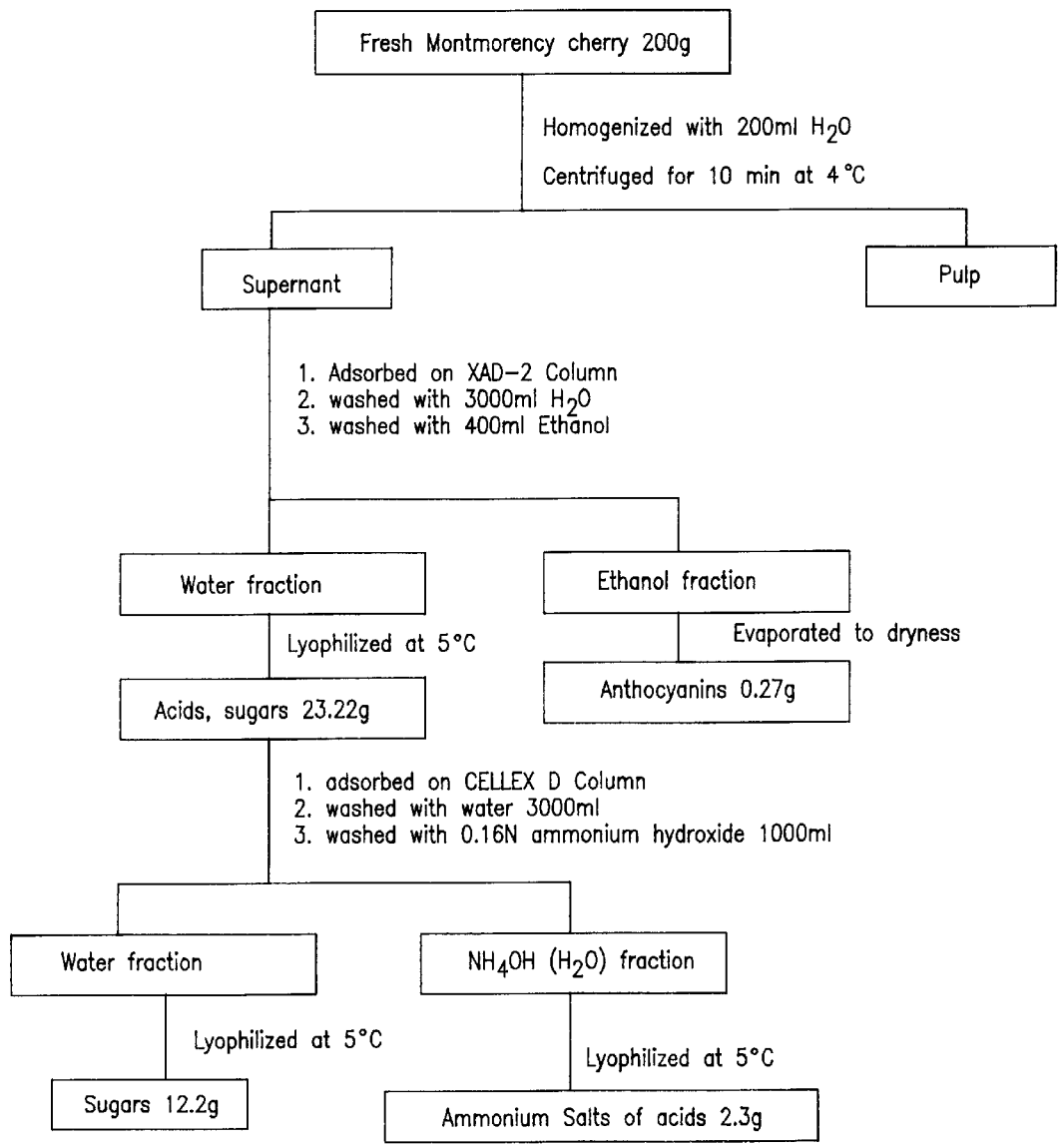
FIG. 16 is a flow diagram showing the method of isolation of various fractions of MONTMORENCY cherries.
Figure 17:
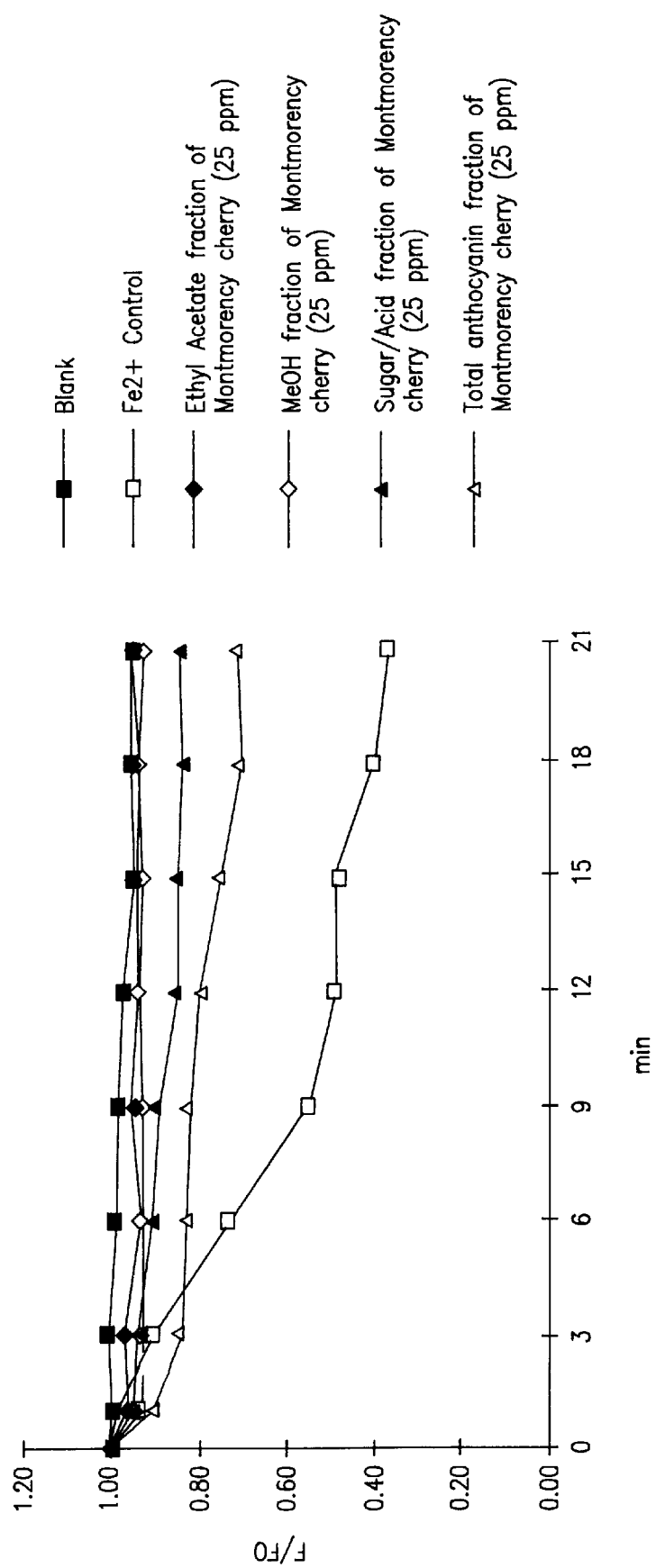
FIG. 17 is a graph showing the inhibition of oxidation by the various fractions of FIG. 16.
Figure 18:
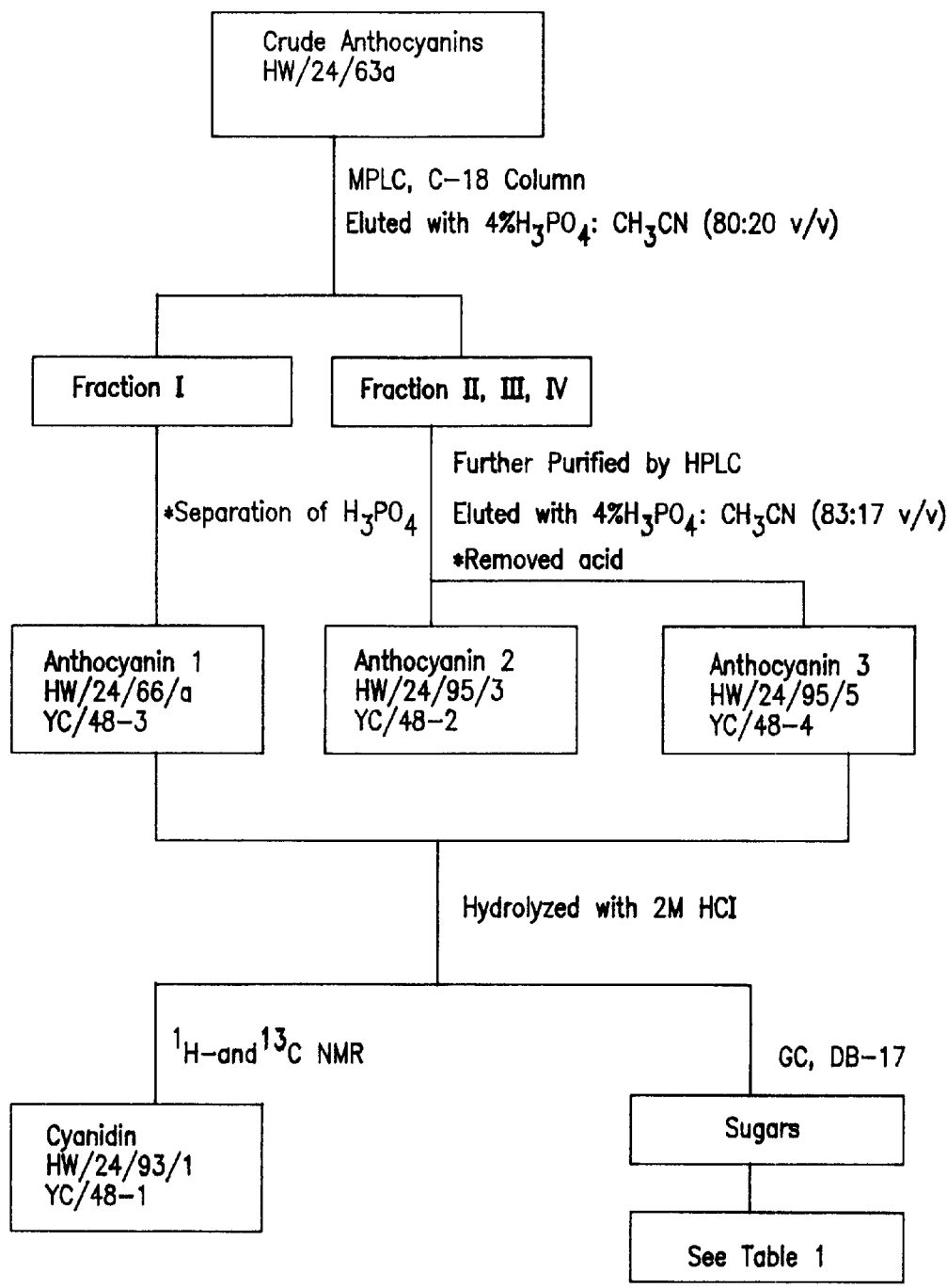
FIG. 18 is a schematic flow diagram showing the method for the purification of anthocyanins 1, 2, and 3 shown in FIG. 1.
Figure 19:
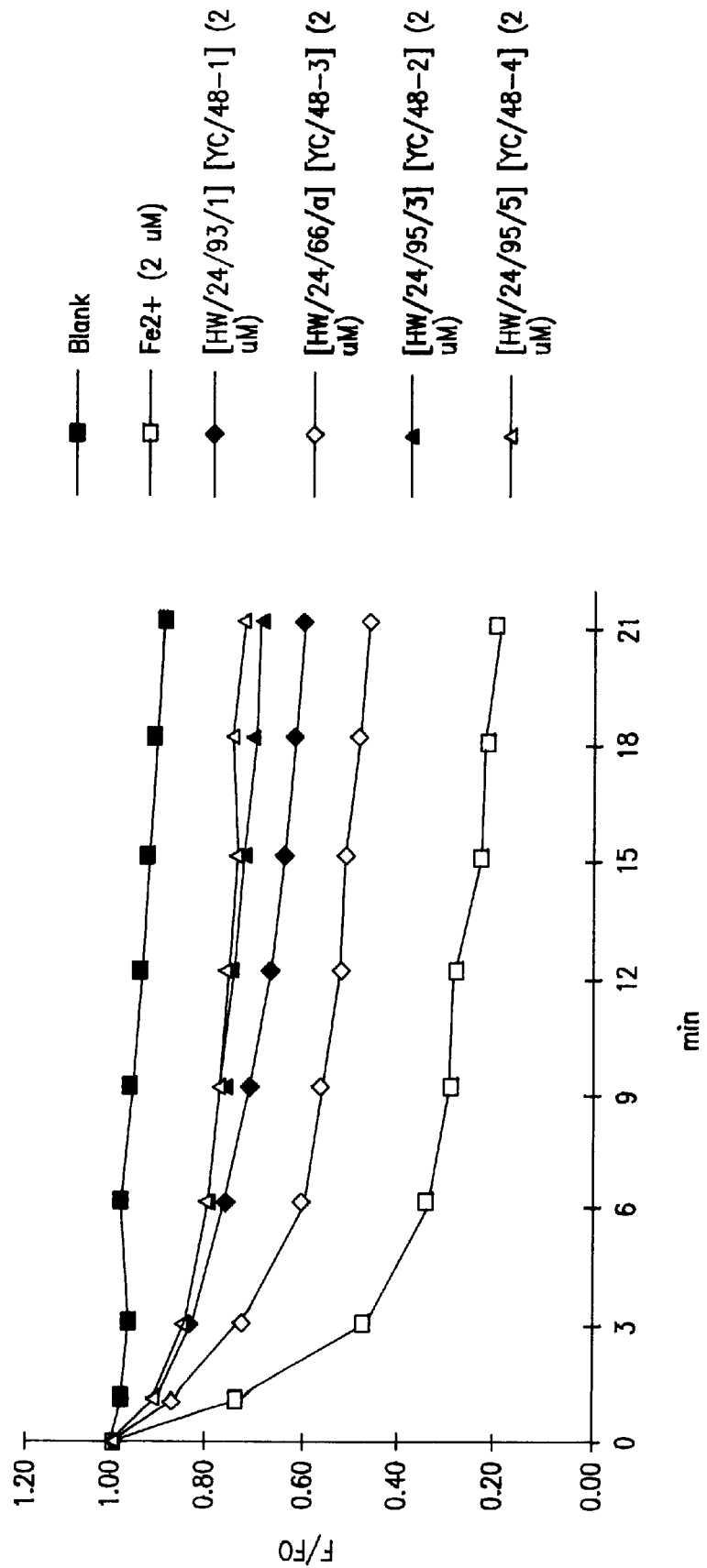
FIG. 19 is a graph showing the inhibition of oxidation by the various anthocyanin fractions shown in FIG. 18.
Figure 20:
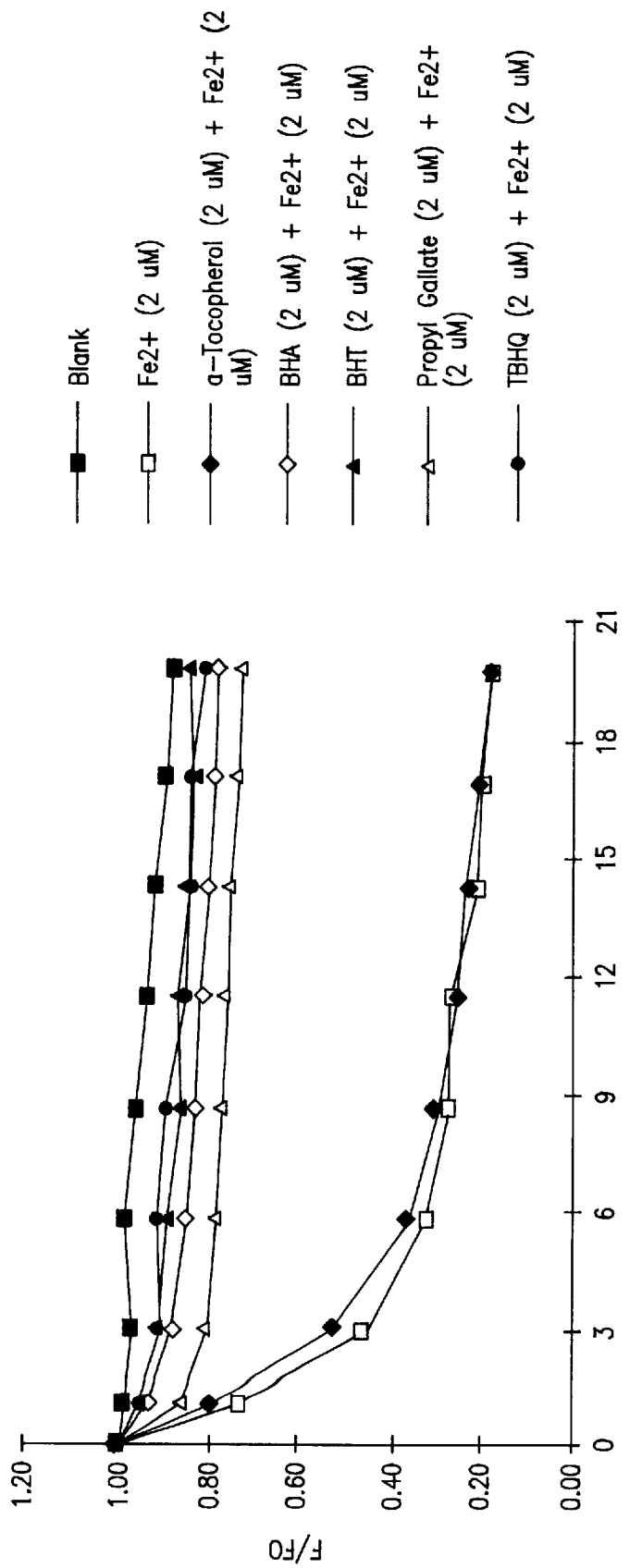
FIG. 20 is a graph showing the antioxidant properties of various known antioxidants.
Figure 21:
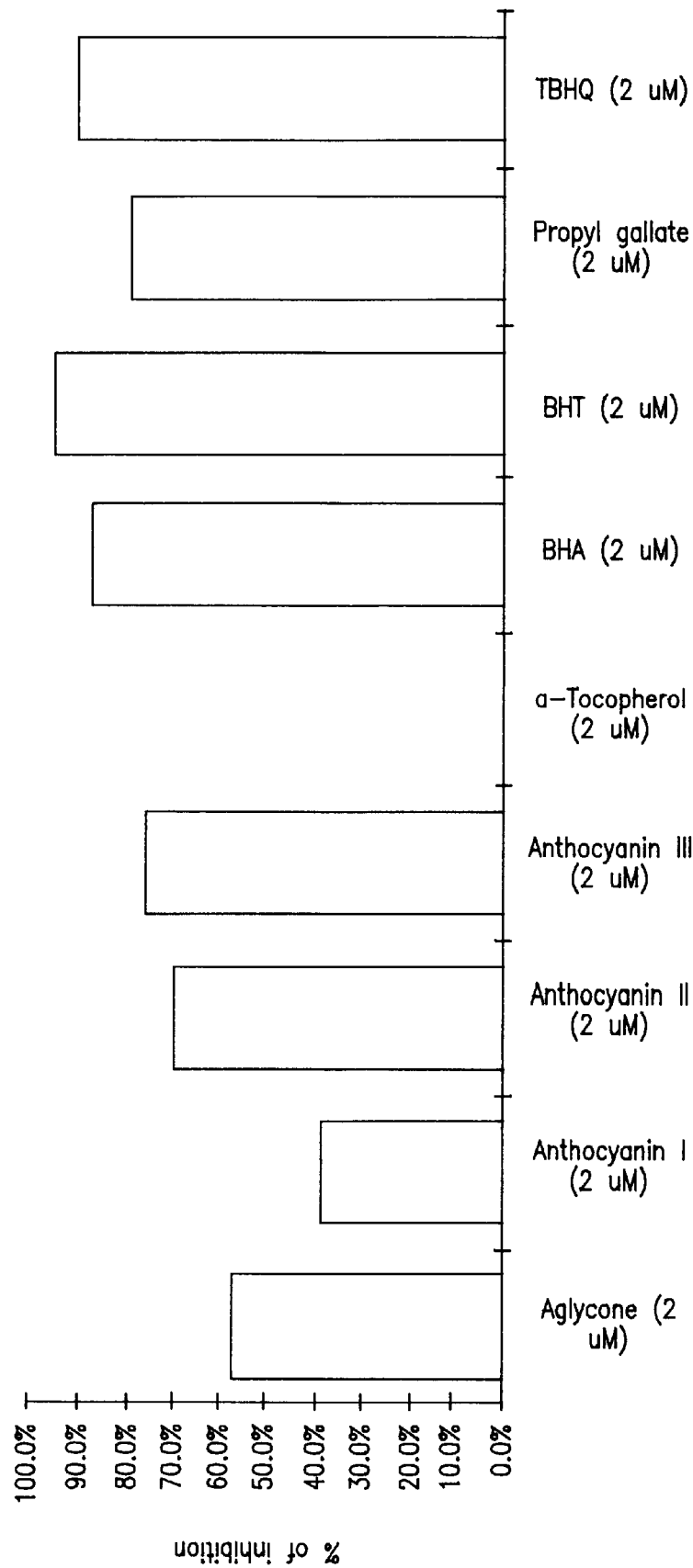
FIG. 21 is a bar graph showing the inhibiting activity of the anthocyanins compared to various known antioxidants.

The present invention relates to a method for inhibiting oxidation of an oxidizable material over time which comprises introducing with the material an isolated and purified composition selected from the group consisting of anthocyanins, cyanidin and mixtures thereof from a tart cherry so that oxidation of the material is inhibited. Preferably the material is a food.

Further, the present invention relates to a product which comprises in admixture: an isolated and purified composition selected from the group consisting of anthocyanins, cyanidin and mixtures thereof from a tart cherry; and a particulate edible bulking agent in an amount between about 0.1 to 30 parts per part of the mixture, which product when introduced with an oxidizable material inhibits the oxidation of the material.

The term "meat" means pork, chicken, fish, turkey and various other sources of flesh which may be eaten. The meat or other food may be fresh and uncooked, cured or cooked, for instance. The term "bulking agent" is used to mean a composition which is added to increase the volume of the composition of the purified composition from the tart cherry. These include any edible starch containing material, protein such as non-fat dry milk. Within this group are flour, sugar, soybean meal, maltodextrin and various condiments, such as salt, pepper, spices and herbs, for instance. The bulking agent is used in an amount between about $10^{-6}$ and $10^6$ parts by weight of the mixture.

The composition is introduced into the food in an amount between about 0.001 and 300 mg/gm of the mateeial, particularly a food. The amount is selected so as to not affect the taste of the food and to produce the inhibition of oxidation. The food can be high (wet) or low moisture (dry) as is well known to those skilled in the art.

The anthocyanins and cyanins are isolated from the tart cherries, preferably the BALATON cherries which contained much more of these compounds. The ethyl acetate soluble fraction of an aqueous extract of the cherries is the most effective, even when compared to more preferred extracts. This is shown from the data in Example 2 and FIGS. 2 to 21.

The BALATON cherry was compared with MONTMORENCY cherry for the anthocyanin content in the following Examples. The results indicate that both cherries contain identical anthocyanins. However, BALATON contains about six times more anthocyanins than in MONTMORENCY. Also, hydrolysis of the total anthocyanins and subsequent GC and NMR experiments with the resulting products indicated that both varieties contain only one aglycone, cyanidin. Cyanidin and peonidin glycosides are reportedly present in MONTMORENCY cherry. The Examples show that the anthocyanins in BALATON and MONTMORENCY cherries are cyanidin-3-(2"-O-β-D-glucopyranosyl-6"-O-α-L-rhamnopyranosyl-β-D-glucopyranoside), cyanidin-3-(6"-O-α-L-rhamnopyranosyl-β-D-glucopyranoside and cyanidin-3-O-β-D-glucopyranoside as set forth in FIG. 1.

EXAMPLE 1

MATERIALS AND METHODS

Cherry fruits. MONTMORENCY and BALATON tart cherries were obtained from commercial growers in Michigan and provided by Cherry Marketing Institute, Inc. (CMI). The cherries were flushed with nitrogen in freezer bags prior to their storage at −20° C.

General experimental. $^1$H NMR, $^{13}$C NMR and DQF COSY spectra were recorded on a Varian 500 and 300 MHz spectrometers using $CD_3OD/DCl$ solution at 25° C. All chemical shifts are given in ppm relative to $CD_3OD$ (3.32 ppm). GC was preformed on an HP 5890 II (Hewlett Packard) using DB-17 (30 m×0.25 mm×0.25 μm) column. The temperature program used was: 150° C., initial temperature held for 5 minutes, and then increased to 210° C. at 5° C. min$^{-1}$, maintained for 5 minutes, and finally to 270° C. at 5° C. min$^{-1}$. The injection port temperature was maintained at 250° C.; The flame ionization detector temperature was 300° C. and carrier gas was helium at a linear flow velocity of 4 cm s$^{-1}$ with a 1:70 split ratio. FAB-MS was carried out on a double focusing mass spectrometer using Xe as reactant gas in glycerol matrix.

HPLC Conditions for anthocyanin analysis. All samples (20 μl each) were analyzed on Chemcopak and Capcellpak C-18 columns (10×250 mm, 5 μm) (Dychrom; Sunnyvale, Calif.) The mobile phase (4% aqueous $H_3PO_4/CH_3CN$ (80:20 v/v) was used under isocratic conditions at a flow rate of 1.5 ml min$^{-1}$. The peaks were detected at 520 nm using a Waters PDA detector. Anthocyanins 1–3, 0.5 mg each, were weighed and dissolved in 1 ml of $H_2O/CH_3CN$ (1:1). The solutions were prepared by the serial dilution of the respective stock solutions to afford 0.25, 0.20, 0.10, 0.05, 0.025 and 0.0125 mg/ml concentrations, respectively. Quantification of anthocyanins were carried out using millennium 2010 chromatography manager.

HPLC Analysis of anthocyanins in cherries. Pitted cherries (100 g) were homogenized and centrifuged as described above. The supernatant was decanted and adjusted with $H_2O$ to a final volume of 250 ml in a volumetric flask. An aliquot of 1 ml of this solution was passed through a preconditioned C-18 Sep-Pak cartridge (Waters Associates). The adsorbed pigments were then washed with water (2 ml) followed by $H_2O/CH_3CN$ (1:1, 1 ml). The eluate was stored at −20° C. prior to HPLC analysis. Both BALATON and MONTMORENCY showed identical HPLC profile (FIG. 1).

Isolation of crude anthocyanins from tart cherries. The pitted cherries (400 g each of BALATON and MONTMORENCY) were homogenized separately for 10 minutes using a Kinematica CH-6010 (Kriens-LU) homogenizer and centrifuged (Model RC5C, Sorvall Instruments) at 10000 g for 10 minutes at 4° C. to separate insoluble materials from the supernatant. The supernatant (400 ml each) was applied to XAD-2 (100 g, amberlite resin, mesh size 20–50; Sigma Chemical Co.) column which was prepared as described by Chandra et al (Chandra, A., et al., J. Agric. Food Chem. 41:1062–1065 (1993)). The column was washed with $H_2O$ (9 L) until the colorless washings gave a pH of about 7. The adsorbed pigments were then eluted with methanol (500 ml). The red methanolic solution was concentrated at 50° C. in vacuo, and the aqueous solution was lyophilized to yield an amorphous red anthocyanin powder, 0.86 and 0.54 g, respectively, for BALATON and MONTMORENCY.

Purification of anthocyanins 1–3. The crude anthocyanins from BALATON was fractionated by C-18 MPLC to produce pure anthocyanins. The anthocyanin mixture (350 mg) was dissolved in water (2 ml), injected into the C-18 column (40×500 mm) and eluted with 4% $H_3PO_4:CH_3CN$ (80:20). Four fractions, I: 125 ml, II: 100 ml, III: 100 ml and IV: 275 ml, were collected and evaporated under reduced pressure. The $H_3PO_4$ from these fractions was removed by passing each fraction through preconditioned C-18 Sep-Pak (Waters Associates) with methanol and followed by 10% methanol. The adsorbed pigment was washed with 5 ml water to remove the acids and then eluted with H₂O/methanol (1:1, 5 ml) to afford pure anthocyanins. The yield of anthocyanins from fractions I–IV were 53, 24, 133 and 64 mg, respectively. HPLC analysis of these fractions revealed that fraction I was pure and contained only anthocyanin 1. Fraction II contained anthocyanins 1 and 2, fraction III had anthocyanins 2 and 3 and fraction IV contained anthocyanin 3 with other phenolics as indicated in their HPLC profiles.

Since fractions II and III from MPLC contained all three of the anthocyanins, 40 mg of II and 30 mg of III were purified further by HPLC on Capcellpak C-18 column (10×250 mm, 5 $\mu$m) (Dychrom; Sunnyvale, Calif.) to yield pure anthocyanins 2 and 3. Peaks were detected using a PDA detector at 520 and 283 nm, respectively. The mobile phase (4% aqueous $H_3PO_4$:$CH_3CN$::83:17 v/v) was used under isocratic conditions at a flow rate of 2.0 ml/min. Respective anthocyanin fractions from HPLC purification from fractions II and III were combined, dried under reduced pressure and purified further using C-18 Sep-Pak to remove $H_3PO_4$. The weights of pure anthocyanins 1–3 were 5.7, 8.9 and 2.9 mg, respectively.

Crude anthocyanins from MONTMORENCY (500 mg) was also fractionated by C-18 MPLC as in the case of BALATON. Three bands with red color were collected as fractions I (10 mg), II (30 mg) and III (20 mg) Fraction I was pure and contained anthocyanin 1. Fractions II and III were not pure by HPLC analysis and contained anthocyanins 1–3.

Anthocyanin1: Cyanidin-3-(2"-O-β-D-glucopyranosyl-6"-O-α-L-rhamnosyl-β-D-glucopyranoside. Red amorphous powder; $^1$H NMR ($CD_3OD$): δ 1.14 (3H, d, J=6.18, H-6""), 2.92 (1H, dt. J=9.28, 3.97 H-5'''), 3.19 (1H, d, J=9.08, 7.74, H-2'''), 3.23 (1H, t, J=9.28, H-4'''), 3.27 (1H, dd, J=9.28, 9.50, H-4""), 3.33 (1H, dd, J=9.08, 9.28, H-3'''), 3.44 (2H, d, J=3.97, H-6'''), 3.50 (1H, dd, J=9.53, 9.28, H-4") 3.56 (1H, dd, J-9.28, 6.18, H-5""), 3.60 (1H, dd, J=9.50, 3.31, H-3'''), 3.61 (1H, dd, J=12.2, 1.76, H-6b"), 3.72 (1H, ddd, J=9.53, 6.41, 1.76 H-5"), 3.77 (1H, dd, J=9.28, 9.08 H-3"), 3.78 (1H, dd, J=3.31, 1.54, H-2""), 4.04 (dd, J=12.2, 6.41, H-6a"), 4.05 (1H, dd, J=9.08, 7.29, H-2"), 4.65 (1H, d, J=1.54, H-1""), 4.76 (1H, d, J=7.74, H-1'''), 5.43 (1H, d, J=7.29, H=1"), 6.67 (1H, d, J=1.96, H-6), 6.90 (1H, d, J=1.96, H-3), 7.06 (1H, d, J=8.66, H-5'), 8.00 (1H, d, J=2.24 H-2'), 8.18 (1H, dd, J=8.66, 2.24, H-6'), 8.89 (1H, s, H-4); $^{13}$C NMR ($CD_3OD$): δ 17.9 (C-6""), 62.3 (C-6"), 67.6 (C-6"), 69.8 (C-5""), 70.8 (C-4'''), 71.2 (C-4"), 71.8 (C-2""), 72.4 (C-3""), 73.9 (C-4''''), 75.9 (C-2'''), 77.2 (C-3"), 77.7 (C-3'''), 77.7 (C-5'''), 77.9 (C-5 "), 82.3 (C-2"), 95.2 (C-8, 101.9 (C-1'''), 102.2 (C-1""), 103.5 (C-6), 104.9 (C-1"), 113.2 (C-10), 117.6 (C-5'), 118.6 (C-2'), 121.2 (C-1'), 128.3 (C-6'), 136.1 (C-4), 145.2 (C-3), 147.4 (C-3'), 155.7 (C-4'), 157.6 (C-9), 159.0 (C-5), 164.3 (C-2), 170.4 (C-7).

Anthocyanin 2: Cyanidin-3-(6"-O-α-L-rhamnopyranosyl-β-D-glucopyranoside). Red amorphous powder, $^1$H NMR ($CD_3OD$): δ 1.15 (3H, d, J=6.14, H-6'''), 3.34 (1H, dd, J=9.49, 9.22, H-4"), 3.41 (1H, dd, J=9.49, 9.21, H-4'''), 3.54 (1H, dd, J-9.21, 6.14, H-5'''), 3.55 (1H, dd, J=9.22, 9.06, H-3"), 3.62 (1H, dd, J=11.90, 1.62, H-6b"), 3.63 (1H, dd, J=9.49, 3.35, H-3'''), 3.67 (1H, dd, J-9.06, 7.53, H-2'''), 3.71 (1H, m, H-5"), 3.80 (1H, dd, J-3.35, 1.67, H-2'''), 4.05 (1H, dd, J=11.90, 6.31, H-6a"), 4.65 (1H, d, J=1.67, H-1'''), 5.29 (1H, d, J=7.53, H-1"), 6.69 (1H, d, J=1.95, H-6), 6.91 (1H, d, J=1.95, H-8), 7.01 (1H, d, J=8.65, H-5'), 8.02 (1H, d, J=2.23, H-2'), 8.27 (1H, dd, J=8.65, 2.23, H-6'), 8.92 (1H, s, H-4); $^{13}$C NMR ($CD_3OD$): δ 17.9 (C-6'''), 67.8 (C-6"), 69.7 (C-5'''), 71.2 (C-4"), 71.9 (C-2'''), 72.4 (C-3'''), 73.9 (C-4'''), 74.7 (C-2"), 77.4 (C-3"), 78.0 (C-5"), 95.3 (C-8), 102.1 (C-1'''), 103.5 (C-1"), 103.5 (C-6), 113.2 (C-10), 117.5 (C-5'), 118.4 (C-2'), 121.2 (C-1'), 128.4 (C-6'), 136.6 (C-4), 145.6 (C-3), 147.4 (C-3'), 155.8 (C-4'), 157.6 (C-9), 159.0 (C-5), 164.3 (C-2), 170.4 (C-7).

Anthocyanin 3: Cyanidin-3-β-D-glucopyranoside. Red amorphous powder, $^1$H NMR ($CD_3OD$): δ 3.34 (1H, dd, J=9.50, 9.22, H-4"), 3.55 (1H, dd, J=9.22, 9.0, H-3"), 3.67 (1H, dd, J=9.0, 7.5, H-2"), 3.68 (1H, dd, J=11.90, 1.62, H-6b"), 3.71 (1H, m, H-5"), 3.91 (1H, dd, J=11.90, 6.30, H-6a'), 5.40 (1H, d, J=7.5, H-1"), 6.71 (1H, d, J=1.95, H-6), 6.98 (1H, d, J=1.95, H-8), 7.07 (1H, d, J=8.65, H-5'), 8.05 (1H, d, J=2.23 H-2'), 8.29 (1H, d, J=8.65, 2.23, H-6'), 8.98 (1H, s, H-4). $^{13}$C-NMR on pure anthocyanin 3 was not performed due to its low yield.

Cyanidin, the aglycone.

The crude anthocyanin powder from BALATON (55 mg) was hydrolyzed with 3 M HCl (15 ml) for 1 hour at 100° C. The red solution was cooled to room temperature and stirred with butanol (20 ml). The mixture was extracted with water (3×20 ml) and the combined water extracts were evaporated to dryness at reduced pressure to yield the sugars (30 mg). The red butanol layer was evaporated to dryness (24.3 mg) and the residue was purified by silica gel preparative TLC using the solvent system ethyl acetate: formic acid: 2 M HCl::85:6:9. The single red band at $R_f$ 0.28 was eluted with MeOH, evaporated under reduced pressure and afforded a red amorphous powder, cyanidin (11.2 mg). Similarly, pure anthocyanins (0.5 mg each) were hydrolyzed also to obtain their respective sugars for GC analysis. The aglycones from anthocyanins 1–3 and the crude anthocyanin gave identical $R_f$ values and HPLC retention times. Also, all aglycones showed identical $^1$H- and $^{13}$C-NMR spectra. $^1$H NMR ($CD_3OD$): δ 6.65 (1H, d, J=1.95, H-6), 6.90 (1H, d, J=1.95, H-8), 7.02 (1H, d, J=8.66, H-5'), 8.11 (1H, d, J=2.23, H-2'), 8.17 (1H, dd, J=8.66, 2.23, H-6'), 8.62 (1H, s, H-4); $^{13}$C NMR ($CD_3OD$): δ 94.7 (C-8), 103.0 (C-6), 113.5 (C-10), 117.2 (C-5'), 117.9 (C-2'), 121.9 (C-1'), 127.1 (C-6'), 134.0 (C-4), 146.5 (C-3), 147.3 (C-3'), 155.1 (C-4'), 156.9 (C-9), 157.9 (C-5), 162.6 (C-2), 168.8 (C-7).

Characterization of sugars by GC analysis. The sugar standards, (1 mg each) rhamnose, fructose, galactose, glucose and the internal standard Phenyl-δ-D-Glucoside (E. Merck, Darmstadt) and the sugars (1 mg each) obtained from the hydrolysis of crude and pure anthocyanins (1–3) were reacted separately with 30 mg/ml Hydroxylamine HCl in dry pyridine (2 ml). The resulting oximes were then reacted with 1.0 ml hexamethyldisilazane (HMDS) and 0.1 ml trifluoroacetic acid (TFA) to yield their silyl derivatives. The samples were then analyzed by GC using an autosampler. Sugars from anthocyanins 1, 2 and 3 were identified by comparing with the retention times of sugar standards. The retention times were 6.97, 9.83, 10.58, 10.90, 19.82 minutes, respectively, for rhamnose, fructose, galactose, glucose and Phenyl-β-D-Glucoside. The GC analysis of sugars yielded from the hydrolysis of anthocyanins showed that anthocyanin 1 contained a 2:1 ratio of glucose and rhamnose. Anthocyanin 2 showed a 1:1 ratio of glucose and rhamnose and anthocyanin 3 had only glucose. Similarly, the GC analysis of sugars from the crude anthocyanin powder indicated that it contained only rhamnose and glucose at a ratio of 2:4, respectively.

RESULTS AND DISCUSSION

Lyophilization of 100 g each of BALATON and MONTMORENCY cherries afforded 8.6 and 7.3% of dry weights, respectively. Sugars and acids in BALATON are about 50% more than that in MONTMORENCY cherries (data not presented). Similarly, total anthocyanins in BALATON cherry is about six times higher than that in MONTMORENCY cherry based on anthocyanin concentrations in fractions obtained from MPLC and HPLC purifications.

Prior to the isolation of anthocyanins for spectral characterization, both BALATON and MONTMORENCY cherries were analyzed by HPLC under identical conditions. HPLC profiles of the cherry extract showed that there are two major and one minor anthocyanins in both varieties as indicated by retention times 8.76, 10.58, 13.38 minutes, respectively, for anthocyanins 1–3 (FIG. 1). Also, it was evident from the marked difference in the red color between these two cherries and HPLC profile (FIG. 1) that MONTMORENCY contained relatively small amounts of anthocyanins compared to BALATON.

Production of pure Anthocyanins (1–3) from BALATON and MONTMORENCY cherry juices were carried out first by adsorbing the pigment on an Amberlite XAD-2 column (Chandra, A., et al, J. Agric. Food Chem. 41:1062–1065 (1993)). The column was washed with water till the eluant gave a pH of @ 7.0. The adsorbed pigments along with other phenolics were eluted with MeOH. The resulting crude anthocyanins were fractionated and purified by C-18 MPLC and HPLC, respectively, to afford pure anthocyanins for spectral studies. Purification of 500 mg crude MONTMORENCY anthocyanins from XAD-2 yielded 60 mg of pure anthocyanins 1–3 compared to 391.43 mg from BALATON. This indicates that crude athocyanins from MONTMORENCY obtained from the XAD-2 contained a higher percentage of other organic compounds.

The presence of cyanidin and respective sugar moieties in anthocyanins 1–3 were confirmed by the comparison of their $^1$H- and $^{13}$C-NMR chemical shifts with the published data (Gläβgen, W. E., et al, Phytochemistry 31:1593–1601 (1992)). The relative configuration and nature of the sugars in anthocyanins 1 and 2 were deduced from the vicinal and geminal $^1$H—$^1$H coupling constants and by DQFCOSY.

The $^1$H NMR spectrum of 1 gave signals for three anomeric protons appeared at δ 5.43, 4.76 and 4.64, respectively for glucose (attached to the aglycone), glucose and rhamnose. Also, the presence of β-D-glucosidic linkage in 1 was confirmed by the large coupling constants for the anomeric protons. The signal at δ 4.64 ppm corresponded to the anomeric proton of an L-rhamnopyranose and the 1.8 Hz coupling constant indicated an α-glycosidic linkage.

The $^{13}$C NMR chemical shifts observed for anthocyanins in BALATON and MONTMORENCY were similar to the published data (Agrawal, P. K., et al., Flavonoid glycoside in carbon-13 NMR of flavonoids. (Ed. Agrawal, P. K.) Elsevier, Amsterdam, 283–364 (1989)). The C-7 resonated at very low field 170.4 ppm compared to the rest of the oxygenated aromatic carbons in anthocyanins. The oxygen cation in ring C is responsible for the downfield shift of C-7 carbon. The $^{13}$C NMR signal for C-5 carbon in 1 at δ 69.8 confirmed the rhamnosyl moiety with an α-linkage to the glucose (Agrawal, P. K., Phytochemistry 31:3307–3330 (1992)).

The downfield shift of the C-2" proton in 1 relative to the C-2" signal of 2 was due to the glucosylation and indicated a 1,2 linkage between the two glucose units. Similarly, the downfield shift of C-6" proton in the $^1$H=NMR spectrum of 1 relative to the C-6 proton signal of glucose was due to the rhamnose moiety and indicated a 1,6 linkage between the glucose and rhamnose. Therefore, anthocyanin 1 is confirmed to be cyanidin-3-(2"-O-β-D-glucopyranosyl-6"-O-α-L-rhamnopyranosyl-β-D-glucopyroside). Anthocyanin 1 gave a molecular ion at m/z 758 [M+H]$^+$ and the base peak at m/z 596 [M+H-C$_6$H$_{10}$O$_5$]) in the FAB MS further confirmed the presence of cyanidin, two glucose and one rhamnose moieties in 1.

$^1$H NMR spectrum of 2 showed signals for two anomeric protons at δ 5.29 (J=7.53 Hz) and 4.64 (J=1.67). This indicated the presence of a β-D-glucose because all vicinal coupling constants were 7.53~11.9 ppm. The doublet (J=6.14 Hz) at 1.15 ppm of a methyl group confirmed one of the sugars as rhamnose in 2. The small coupling constant of 1.67 Hz for the anomeric proton suggested an α-rhamnosyl linkage. The C-6" proton of glucose at 5.5 ppm indicated a 1,6 linkage between the glucose and rhamnose. The FAB-MS of 2 gave the moelcular ion at m/z 596 [M+H]$^+$ and confirmed its structure as cyanidin-3-(6"-O-α-L-rhamnopyranosyl-β-D-glucopyranoside.

The $^1$H NMR of anthocyanin 3 revealed only a single glucose moiety attached to the aglycone cyanidin. The structure of 3 was confirmed to be cyanidin-3-β-D-glucoside. Hydrolysis of crude anthocyanins and TLC of resulting products showed that there was only one aglycone present in both BALATON and MONTMORENCY cherries. $^{13}$C NMR data showed this aglycone as cyanidin.

The results suggest that there are only three identical anthocyanins present in both BALATON and MONTMORENCY cherries. The yields of spectroscopically pure anthocyanins 1–3 in 100 g of fresh BALATON and MONTMORENCY cherries were 14.99, 6.20; 6.18, 0.97; 2.42, 0.35 mg, respectively. The amount of anthocyanins isolated from MONTMORENCY in our studies show that it is lower than the reported yields (Dekazos, E. D., J. Food Sci. 35:237–241 (1970)). However, this may be due to varying environmental and nutritional factors. An important point to note is that when anthocyanins are monitored by HPLC at 520 nm, other phenolic compounds which absorb at 23 nm are ignored. We have isolated at least four phenolic compounds co-eluted with the anthocyanins and detected at 283 nm.

Chandra et al (J. Agric. Food Chem. 40:967–969 (1992)) reported that MONTMORENCY cherries grown in Michigan contain only cyanidin-3-sophoroside and cyanidin-3-glucoside. These results were confirmed by matching their retention times to those of the anthocyanins present in an authentic sample of blackberry juice described by Hong and Wrolstad (Hong, V., et al., J. Agric. Food Chem. 38:698–708 (1990); and Hong, V., et al., J. Agric. Food Chem. 38:708–715 (1990)). Also, earlier reports indicated that there are peonidin-3-glycoside and peonidin-3-galactoside present in MONTMORENCY cherry. However, the present invention indicates that MONTMORENCY contains the same number of anthocyanins found in BALATON cherries and were identical. This is the first description of the characterization of anthocyanins from BALATON cherries and the spectral characterization of anthocyanins from MONTMORENCY cherries.

EXAMPLE 2

The anthocyanin products of Example 1 were tested under various conditions using a fluorescent assay for antioxidant activity. The fluorescent assay is described first.

Fluorescence assay for antioxidant activity (general): The need to screen large numbers of compounds or extracts for antioxidant activity requires that a model system (or systems) be employed which reasonably well represents the structural and functional characteristics of the substrate in the food product. The test must also be sensitive, rapid, and inexpensive. Our laboratory has developed a fluorescence-based assay for evaluating antioxidant efficacy which fulfills these criteria (Arora, A., and G. M. Strasburg, J. Am. Chem. Soc. 1996)). Large unilamellar vesicles consisting of 1-stearoyl-2-linoleoly-sn-glycero-3-phosphocholine are prepared, which closely resemble the properties of biological membranes, one of the primary sites of peroxidation. A fluorescent probe, 1,6-diphenylhexatriene propionic acid, is incorporated into the membranes such that the polar head group anchors the probe near the aqueous interface, while the hydrophobic portion lies parallel to the fatty acid chains. This probe reacts with the free radicals generated during peroxidation, resulting in a decrease in fluorescence intensity with time. A peroxidation initiator (such as ferrous metal ions or the free radical generator AAPH (What is AAPH) is used to start the reaction, and the kinetics of fluorescence decrease are determined in the presence or absence of the antioxidant to be tested. An assay for a compound at a given concentration presently takes only twenty-one minutes, consumes only a few micrograms of lipid, and can be readily conducted with a simple fluorometer.

Fluorescence assay for antioxidant activity (specific details): Large unilamellar vesicles (LUVs) are prepared from 1-stearoyl-2-linoleoyl-sn-glycero-3-phosphocholine according to the procedure outlined by MacDonald et al (MacDonald, R. C., et al., Biochim. Biophys. Acta 1061:297–303 (1991)). Briefly, the lipid is dissolved in chloroform, and is dried to a thin film using a rotary evaporator. The dried film is resuspended in an aqueous buffer, and is repeatedly extruded through a polycarbonate filter of 100 nm pore size using a Liposofast piposome extruder (Avestin, Inc., Ottawa, Canada). The homogeneity of size (80–100 nm) and the unilamellar nature of the vesicles have been confirmed by our laboratory using freeze-fracture scanning electron microscopy. The fluorescent probe, diphenylhexatriene-propionic acid (DPH-PA), is incorporated into the vesicles during preparation at a mole ratio of 1:350 (probe:lipid). For the fluorescence experiments, LUVs containing DPH-PA is suspended at a final concentration of 100 $\mu$M in 100 mM NaCl, 50 mM tris-HEPES buffer at pH 7.0. The fluorescent probe is excited at 384 nm and emission is monitored at 423 nm. Lipid oxidation is inhibited in the LUVs by addition of ferrous ions or the free radical generator AAPH; the progress is monitored by the decrease of the fluorescence intensity of DPH-PA resulting from reaction with free radicals generated over twenty-one minutes. A plot of the decrease of fluorescence intensity as a function of time will be used to determine the kinetics of lipid oxidation.

The results of the assays of the various fractions are shown in FIGS. 2 to 21 and Table 1. The results show that a mixture of the crude anthocyanin extract with methylacetate is more effective than any of the purified extracts inhibiting oxidation.

EXAMPLE 3

Examples of use in foods, particularly meats, to be added.

| % of inhibition of cherry extracts | Fl. int. at 21 min.[1] | % of inh.[2] |
|---|---|---|
| Blank | 0.92 | 0.934 |
| Fe2+ | 0.28 | 0.35 |
| Bal./hexane (50 ppm)(HW/24/112.1 | 0.58 | 46.9% |
| Mont./hexane (50 ppm) | 0.61 | 51.6% |
| Bal./EtOAc (25 ppm)(HW/24/112/2) | 0.957 | 103.9% |

-continued

| % of inhibition of cherry extracts | Fl. int. at 21 min.[1] | % of inh.[2] |
|---|---|---|
| Mont./EtOAc (25 ppm) | 0.936 | 100.3% |
| Bal./MeOH (25 ppm)(HW/24/112/3) | 0.896 | 93.5% |
| Mont./MeOH (25 ppm) | 0.908 | 95.5% |
| Bal./Antho. crd (25 ppm) | 0.941 | 101.2% |
| Mont./antho. crd (25 ppm) | 0.699 | 59.8% |
| Blank | 0.93 | |
| Fe2+ | 0.24 | |
| [HW/24/120/1][YC/63-1](50 ppm) | 0.28 | 5.8% |
| [HW/24/120/2][YC/63-2](50 ppm) | 0.23 | −1.4% |
| [HW/24/120/3][YC/63-3](50 ppm) | 0.34 | 14.5% |
| [HW/24/120/4][YC/63-4](50 ppm) | 0.63 | −56.5% |
| [HW/24/120/5][YC/63-5](50 ppm) | 0.75 | 73.9% |
| [HW/24/120/6][YC/63-6](50 ppm) | 0.82 | 84.1% |
| [HW/24/120/7][YC/63-7](50 ppm) | 0.86 | 89.9% |
| Blank | 0.92 | |
| Fe2+ | 0.18 | |
| [HW/24/113/1][YC/58-2](50 ppm) | 0.24 | 8.1% |
| [HW/24/113/2][YC/58-3](50 ppm) | 0.37 | 25.7% |
| [HW/24/113/3][YC/58-4](50 ppm) | 0.41 | 31.1% |
| [HW/24/113/4][YC/58-5](50 ppm) | 0.59 | 55.4% |
| [HW/24/113/1][YC/65-1](50 ppm) | 0.7 | 66.2% |
| [HW/24/132/2][YC/65-2](50 ppm) | 0.66 | 61.0% |
| [HW/24/132/3][YC/65-3](50 ppm) | 0.39 | 26.0% |
| Blank | 0.96 | |
| Fe2+ | 0.19 | |
| Blank | 0.91 | |
| Fe2+ | 0.21 | |
| Aglycone (2 $\mu$M) | 0.61 | 57.1% |
| Anthocyanin 1 (2 $\mu$M)(HW/24/66/a) | 0.48 | 38.6% |
| Anthocyanin II (HW/24/95/3) | 0.7 | 70.0% |
| Anthocyanin III (2 $\mu$M)(HW/24/95/5) | 0.74 | 75.7% |
| a-Tocopherol (2 $\mu$M) | 0.21 | 0.0% |
| BHA (2 $\mu$m) | 0.82 | 87.1% |
| BHT (2 $\mu$M) | 0.87 | 94.3% |
| Propyl gallate (2 $\mu$M) | 0.76 | 78.6% |
| TBHQ (2 $\mu$M) | 0.84 | 90.0% |

[1]Fuorescent intenity at 21 minutes.
[2]Percent Inhibition based upon $Fe^{+2}$ oxidation.

The anthocyanins are naturally occurring and are non-toxic. The ethyl acetate extracts are particularly effective.

The results are shown in FIGS. 3, 5, 6, 8, 9, 10, 12, 13, 15, 17, 19, 20 and 21.

It is intended that the foregoing description be only illustrative of the present invention and that the present invention be limited only by the hereinafter appended claims.

We claim:

1. A product which comprises in admixture:
   (a) an isolated and purified composition which consists essentially of a mixture of anthocyanins which is cyanidin-3-(2"-O-β-D-glucopyranosyl-6"-O-α-L-rhamnosyl-β-D-glucopyranoside), cyanidin-3-(6"-O-α-L-rhamnopyranosyl-β-D-glucopyranoside) and cyanidin-3-β-D-glucopyranoside, from a tart cherry; and
   (b) a particulate edible bulking agent in an amount between about $10^{-6}$ to $10^6$ parts per part by weight of the mixture, which product when introduced with an oxidizable material inhibits the oxidation of the material.

2. The composition of claim 1 wherein the bulking agent is an edible starch or protein.

3. The composition of claim 1 wherein the bulking agent is powdered non-fat dry milk.

4. The composition of claim 1 wherein the tart cherry is selected from the group consisting of BALATON and MONTMORENCY.

* * * * *